United States Patent
Tsuru

(10) Patent No.: US 9,288,498 B2
(45) Date of Patent: Mar. 15, 2016

(54) IMAGE PROCESSING APPARATUS, IMAGE PROCESSING METHOD, AND IMAGE PROCESSING SYSTEM

(75) Inventor: Daisuke Tsuru, Chiba (JP)

(73) Assignee: SONY CORPORATION, Tokyo (JP)

(*) Notice: Subject to any disclaimer, the term of this patent is extended or adjusted under 35 U.S.C. 154(b) by 780 days.

(21) Appl. No.: 13/564,891

(22) Filed: Aug. 2, 2012

(65) Prior Publication Data

US 2013/0058414 A1 Mar. 7, 2013

(30) Foreign Application Priority Data

Sep. 6, 2011 (JP) ................................ 2011-193808

(51) Int. Cl.
*H04N 19/40* (2014.01)
*H04N 19/176* (2014.01)
*H04N 19/51* (2014.01)
*H04N 19/103* (2014.01)

(52) U.S. Cl.
CPC ............. *H04N 19/40* (2014.11); *H04N 19/103* (2014.11); *H04N 19/176* (2014.11); *H04N 19/51* (2014.11)

(58) Field of Classification Search
CPC ............ H04N 21/2365; H04N 19/103; H04N 19/176; H04N 19/40; H04N 19/51; H04N 19/00472; H04N 19/00018; H04N 19/00278; H04N 19/00412; H04N 19/00563; H04N 19/00587; H04N 19/00733; H04N 19/00945; H04N 21/4347
USPC .................................................. 375/240.16
See application file for complete search history.

(56) References Cited

U.S. PATENT DOCUMENTS

| 5,602,592 | A | 2/1997 | Mori et al. |
|---|---|---|---|
| 7,194,032 | B1 | 3/2007 | Easwar et al. |
| 7,440,033 | B2* | 10/2008 | Salzer et al. .................. 348/458 |
| 8,644,672 | B2* | 2/2014 | Kato ............................. 386/232 |
| 2001/0003533 | A1* | 6/2001 | Saunders et al. ......... 375/240.16 |
| 2004/0001544 | A1* | 1/2004 | Mehrotra .................. 375/240.1 |

(Continued)

FOREIGN PATENT DOCUMENTS

| EP | 1 107 602 A1 | 6/2001 |
|---|---|---|
| GB | 2 349 771 A | 11/2000 |

(Continued)

OTHER PUBLICATIONS

Extended European Search Report issued Nov. 6, 2012 in Patent Application No. 12177876.5.
Shih-Fu Chang, et al., "Manipulation and Compositing of MC-DCT Compressed Video", IEEE Journal on Selected Areas in Communications, XP000492740A, vol. 13, No. 1, Jan. 1, 1995, pp. 1-11.

*Primary Examiner* — Mohammed Rahaman
(74) *Attorney, Agent, or Firm* — Hazuki International, LLC

(57) ABSTRACT

Provided is an image processing apparatus including an encoding processing unit that generates a plurality of encoded streams of different display sizes with respect to each of a plurality of picture contents, encodes the picture contents in units of predetermined blocks using the encoded streams, and generates an encoded stream of a multi-picture reproduction image to display the plurality of picture contents at the same time. When parameters regarding encoding of an original block that is a block of the picture contents corresponding to the predetermined block, which are included in the encoded streams of the picture contents, are prohibition parameters prohibited in the encoded stream of the multi-picture reproduction image, the encoding processing unit decodes the encoded streams of the original block, reencodes the streams, and sets the obtained encoded streams as the encoded streams of the predetermined block.

8 Claims, 18 Drawing Sheets

(56) References Cited

U.S. PATENT DOCUMENTS

2007/0132784 A1* 6/2007 Easwar et al. ............... 345/629
2007/0147789 A1* 6/2007 Kato ........................... 386/111
2008/0159394 A1 7/2008 Lee
2012/0069904 A1* 3/2012 Amon et al. ............ 375/240.13
2012/0163468 A1 6/2012 Lee

FOREIGN PATENT DOCUMENTS

WO WO 01/19091 A2 3/2001
WO WO 2010/099917 A1 9/2010

* cited by examiner

FIG. 20

| IntraPredMode [puPartIdx] | IntraPredType [puPartIdx] | IntraPredAngle [puPartIdx] |
|---|---|---|
| 0 | Intra_Vertical | 0 |
| 1 | Intra_Horizontal | 0 |
| 2 | Intra_DC | − |
| 3 | Intra_Vertical | −8 |
| 4 | Intra_Vertical | −4 |
| 5 | Intra_Vertical | +4 |
| 6 | Intra_Vertical | +8 |
| 7 | Intra_Horizontal | −4 |
| 8 | Intra_Horizontal | +4 |
| 9 | Intra_Horizontal | +8 |
| 10 | Intra_Vertical | −6 |
| 11 | Intra_Vertical | −2 |
| 12 | Intra_Vertical | +2 |
| 13 | Intra_Vertical | +6 |
| 14 | Intra_Horizontal | −6 |
| 15 | Intra_Horizontal | −2 |
| 16 | Intra_Horizontal | +2 |
| 17 | Intra_Horizontal | +6 |
| 18 | Intra_Vertical | −7 |
| 19 | Intra_Vertical | −5 |
| 20 | Intra_Vertical | −3 |
| 21 | Intra_Vertical | −1 |
| 22 | Intra_Vertical | +1 |
| 23 | Intra_Vertical | +3 |
| 24 | Intra_Vertical | +5 |
| 25 | Intra_Vertical | +7 |
| 26 | Intra_Horizontal | −7 |
| 27 | Intra_Horizontal | −5 |
| 28 | Intra_Horizontal | −3 |
| 29 | Intra_Horizontal | −1 |
| 30 | Intra_Horizontal | +1 |
| 31 | Intra_Horizontal | +3 |
| 32 | Intra_Horizontal | +5 |
| 33 | Intra_Horizontal | +7 |

FIG. 21

| dxIntra | dyIntra | IntraPredMode [puPartIdx] | Name of IntraPredMode [puPartIdx] | xyAxisFlage of IntraPredMode [puPartIdx] | PredGroup of IntraPredMode [puPartIdx] |
|---|---|---|---|---|---|
| – | – | 0 | Intra_Vertical | – | 0 |
| – | – | 1 | Intra_Horizontal | – | 1 |
| – | – | 2 | Intra_DC | – | 2 |
| – | – | 3 | Intra_Plane | – | 2 |
| 1 | –1 | 4 | Intra_Angle0 | 0 | 3 |
| 1 | 1 | 5 | Intra_Angle1 | 0 | 4 |
| 1 | 2 | 6 | Intra_Angle2 | 0 | 5 |
| 2 | 1 | 7 | Intra_Angle3 | 0 | 6 |
| 1 | –2 | 8 | Intra_Angle4 | 0 | 7 |
| 2 | –1 | 9 | Intra_Angle5 | 1 | 8 |
| 2 | –11 | 10 | Intra_Angle6 | 0 | 0 |
| 5 | –7 | 11 | Intra_Angle7 | 0 | 3 |
| 10 | –7 | 12 | Intra_Angle8 | 0 | 3 |
| 11 | 3 | 13 | Intra_Angle9 | 0 | 6 |
| 4 | 3 | 14 | Intra_Angle10 | 0 | 5 |
| 1 | 11 | 15 | Intra_Angle11 | 0 | 0 |
| 1 | –1 | 16 | Intra_Angle12 | 1 | 3 |
| 12 | –3 | 17 | Intra_Angle13 | 1 | 8 |
| 1 | –11 | 18 | Intra_Angle14 | 0 | 0 |
| 1 | –7 | 19 | Intra_Angle15 | 0 | 7 |
| 3 | –10 | 20 | Intra_Angle16 | 0 | 3 |
| 5 | –6 | 21 | Intra_Angle17 | 0 | 3 |
| 7 | –6 | 22 | Intra_Angle18 | 0 | 3 |
| 7 | –4 | 23 | Intra_Angle19 | 0 | 8 |
| 11 | 1 | 24 | Intra_Angle20 | 0 | 1 |
| 6 | 1 | 25 | Intra_Angle21 | 0 | 1 |
| 8 | 3 | 26 | Intra_Angle22 | 0 | 6 |
| 5 | 3 | 27 | Intra_Angle23 | 0 | 5 |
| 5 | 7 | 28 | Intra_Angle24 | 0 | 5 |
| 2 | 7 | 29 | Intra_Angle25 | 0 | 5 |
| 5 | –7 | 30 | Intra_Angle26 | 1 | 3 |
| 4 | –3 | 31 | Intra_Angle27 | 1 | 3 |
| Bi-linear mode | | 32 | Intra_Bilinear | – | 2 |

IMAGE PROCESSING APPARATUS, IMAGE PROCESSING METHOD, AND IMAGE PROCESSING SYSTEM

BACKGROUND

The present disclosure relates to an image processing apparatus, an image processing method, and an image processing system and, more particularly, to an image processing apparatus, an image processing method, and an image processing system that provide a multi-picture reproduction system according to an encoding standard in which a processing load and image quality deterioration are small.

As contents become digitized and an infrastructure to transmit pictures is configured, distribution of pictures through the Internet is becoming increasingly common. In recent years, with personal computers, television receivers that can be connected to a network are used as receiving-side devices. Therefore, distributed picture contents can be viewed using the television receiver. In recent years, various channels including private contents can be provided to viewers through the network by the development of a cloud service. For this reason, the need for a multi-picture reproduction system shown in FIG. 1 in which a plurality of picture contents can be viewed at the same time and desired picture contents can be simply searched has become high.

In the multi-picture reproduction system of FIG. 1, a multi-picture reproduction image that is displayed on a screen is configured using a plurality of picture contents. A main picture content that is a picture content to be viewed mainly among the plurality of picture contents to be displayed is arranged with a maximum size at the center of the screen. The other picture contents that can be selected (switched) are arranged around the main picture content with sizes smaller than the size of the main picture content. The picture contents that can be selected are a TV broadcasting channel, a Web screen, a video content such as a movie, and a TV chatting screen and are acquired from a cloud (network).

As a first method of realizing the display of the multi-picture reproduction image, there is a method of receiving a plurality of encoded streams corresponding to a plurality of picture contents from a server in a cloud. A client-side device receives the plurality of encoded streams, decodes the streams, executes synthesis processing, and generates a multi-picture reproduction image. For example, Japanese Patent Application Publication No. 2002-064818 discloses a multi-picture reproduction image in which a plurality of elementary streams (ES) are received and wide display regions are allocated to the ES having the higher priorities on the basis of the display priorities.

SUMMARY

However, a wide transmission band is necessary to distribute the plurality of encoded streams. Because the client-side device should decode the plurality of encoded streams at the same time and execute the synthesis processing, a receiver becomes expensive.

As a second method of realizing the display of the multi-picture reproduction image, there is a method of generating a multi-picture reproduction image as one encoded stream and performing distribution on a server side, as shown in FIG. 2. In this case, a server decodes a plurality of picture contents to be synthesized, reencodes the picture contents after resizing and image synthesizing, and generates encoded streams. Therefore, because the server executes processing for performing decoding, resizing, image synthesizing, and reencoding, with respect to each picture content, a load thereof becomes large. In addition, the image quality is deteriorated by reencoding after decoding.

The encoded streams of the multi-picture reproduction image should follow the encoding standard.

The present disclosure has been made in view of the above-described circumstances and the present disclosure provides a multi-picture reproduction system according to an encoding standard in which a processing load and image quality deterioration are small.

According to a first embodiment of the present disclosure, there is provided an image processing apparatus including an encoding processing unit that generates a plurality of encoded streams of different display sizes with respect to each of a plurality of picture contents, encodes the picture contents in units of predetermined blocks using the encoded streams, and generates an encoded stream of a multi-picture reproduction image to display the plurality of picture contents at the same time. When parameters regarding encoding of an original block that is a block of the picture contents corresponding to the predetermined block, which are included in the encoded streams of the picture contents, are prohibition parameters prohibited in the encoded stream of the multi-picture reproduction image, the encoding processing unit decodes the encoded streams of the original block, reencodes the streams, and sets the obtained encoded streams as the encoded streams of the predetermined block, and when the parameters of the original block are not the prohibition parameters, the encoding processing unit sets the encoded streams of the original block as the encoded streams of the predetermined block.

An image processing method according to the first embodiment of the present disclosure corresponds to the image processing apparatus according to the first embodiment of the present disclosure.

According to the first embodiment of the present disclosure, a plurality of encoded streams of different display sizes is generated with respect to each of a plurality of picture contents, the picture contents are encoded in units of predetermined blocks using the encoded streams, and an encoded stream of a multi-picture reproduction image to display the plurality of picture contents at the same time is generated. Specifically, when parameters regarding encoding of an original block that is a block of the picture contents corresponding to the predetermined block, which are included in the encoded streams of the picture contents, are prohibition parameters prohibited in the encoded stream of the multi-picture reproduction image, the encoding processing unit decodes the encoded streams of the original block, reencodes the streams, and sets the obtained encoded streams as the encoded streams of the predetermined block, and when the parameters of the original block are not the prohibition parameters, the encoding processing unit sets the encoded streams of the original block as the encoded streams of the predetermined block.

According to a second embodiment of the present disclosure, there is provided an image processing system including a server device and a client device, and the server device includes an encoding processing unit that generates a plurality of encoded streams of different display sizes with respect to each of a plurality of picture contents, encodes the picture contents in units of predetermined blocks using the encoded streams, and generates an encoded stream of a multi-picture reproduction image to display the plurality of picture contents at the same time, and a transmitting unit that transmits the encoded stream of the multi-picture reproduction image generated by the encoding processing unit to the client device. When parameters regarding encoding of an original block that is a block of the picture contents corresponding to the predetermined block, which are included in the encoded streams of the picture contents, are prohibition parameters prohibited in the encoded stream of the multi-picture reproduction image, the encoding processing unit decodes the encoded streams of the original block, reencodes the streams, and sets the obtained encoded streams as the encoded streams of the predetermined block, and when the parameters of the original block are not the prohibition parameters, the encoding processing unit sets the encoded streams of the original block as the encoded streams of the predetermined block, and the client device includes a receiving unit that receives the encoded stream of the multi-picture reproduction image transmitted by the transmitting unit, and a display control unit that displays the multi-picture reproduction image on a predetermined display unit on the basis of the received encoded stream of the multi-picture reproduction image.

According to the second embodiment of the present disclosure, a plurality of encoded streams of different display sizes is generated with respect to each of a plurality of picture contents, the picture contents are encoded in units of predetermined blocks using the encoded streams, and an encoded stream of a multi-picture reproduction image to display the plurality of picture contents at the same time is generated. Specifically, when parameters regarding encoding of an original block that is a block of the picture contents corresponding to the predetermined block, which are included in the encoded streams of the picture contents, are prohibition parameters prohibited in the encoded stream of the multi-picture reproduction image, the encoding processing unit decodes the encoded streams of the original block, reencodes the streams, and sets the obtained encoded streams as the encoded streams of the predetermined block, and when the parameters of the original block are not the prohibition parameters, the encoding processing unit sets the encoded streams of the original block as the encoded streams of the predetermined block. Subsequently, the server device transmits the generated encoded stream of the multi-picture reproduction image to the client device.

The transmitted encoded stream of the multi-picture reproduction image is received by the client device and the multi-picture reproduction image is displayed on the predetermined display unit on the basis of the received encoded stream of the multi-picture reproduction image.

According to the embodiments of the present disclosure described above, a multi-picture reproduction system according to an encoding standard in which a processing load and image quality deterioration are small can be provided.

BRIEF DESCRIPTION OF THE DRAWINGS

FIG. 20 is a diagram showing a first example of an intra prediction mode of HEVC;

FIG. 21 is a diagram showing a second example of an intra prediction mode of HEVC.

DETAILED DESCRIPTION OF THE EMBODIMENTS

Figure 1:
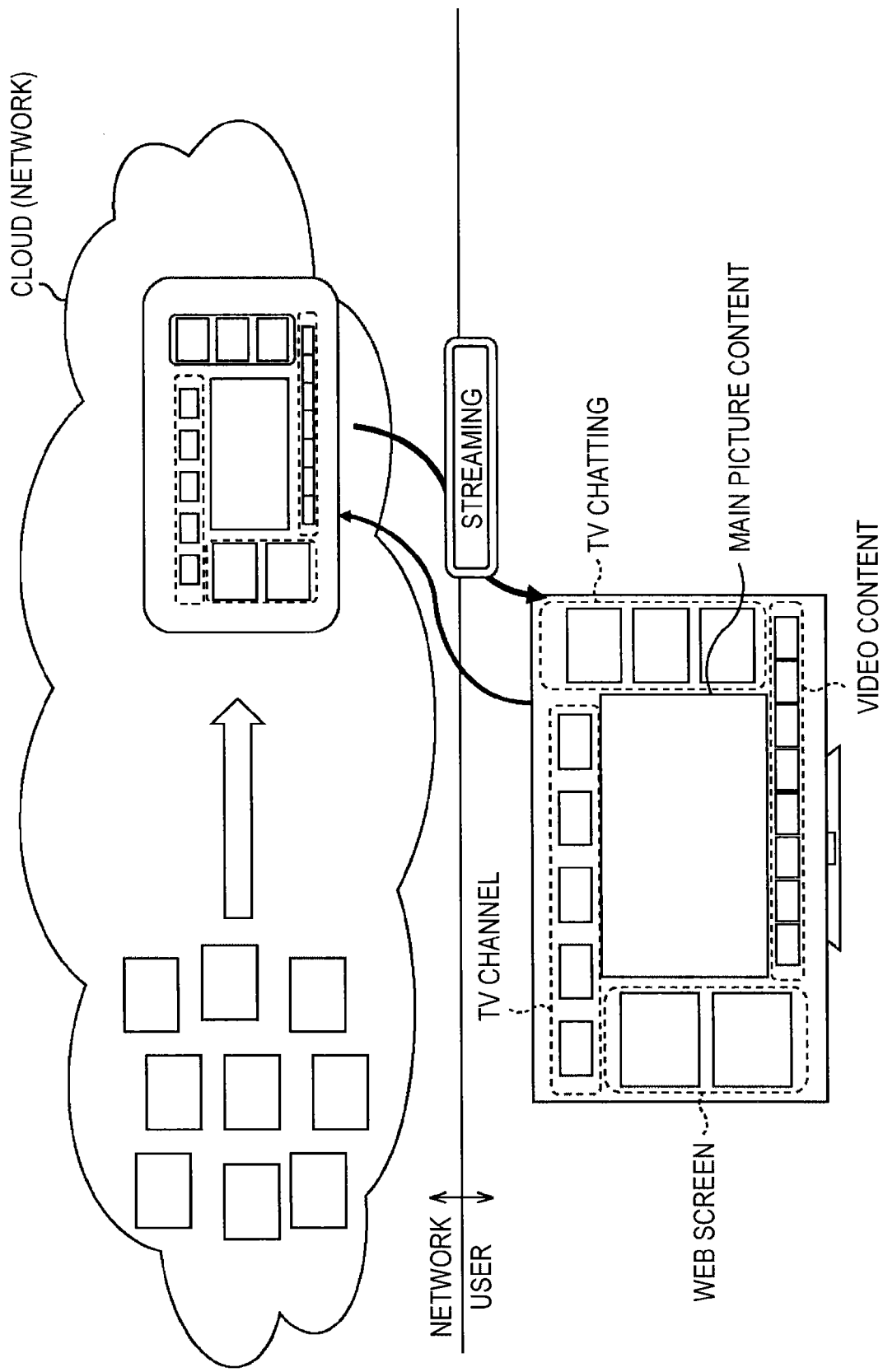
FIG. 1 is a diagram showing a multi-picture reproduction system.
Figure 2:
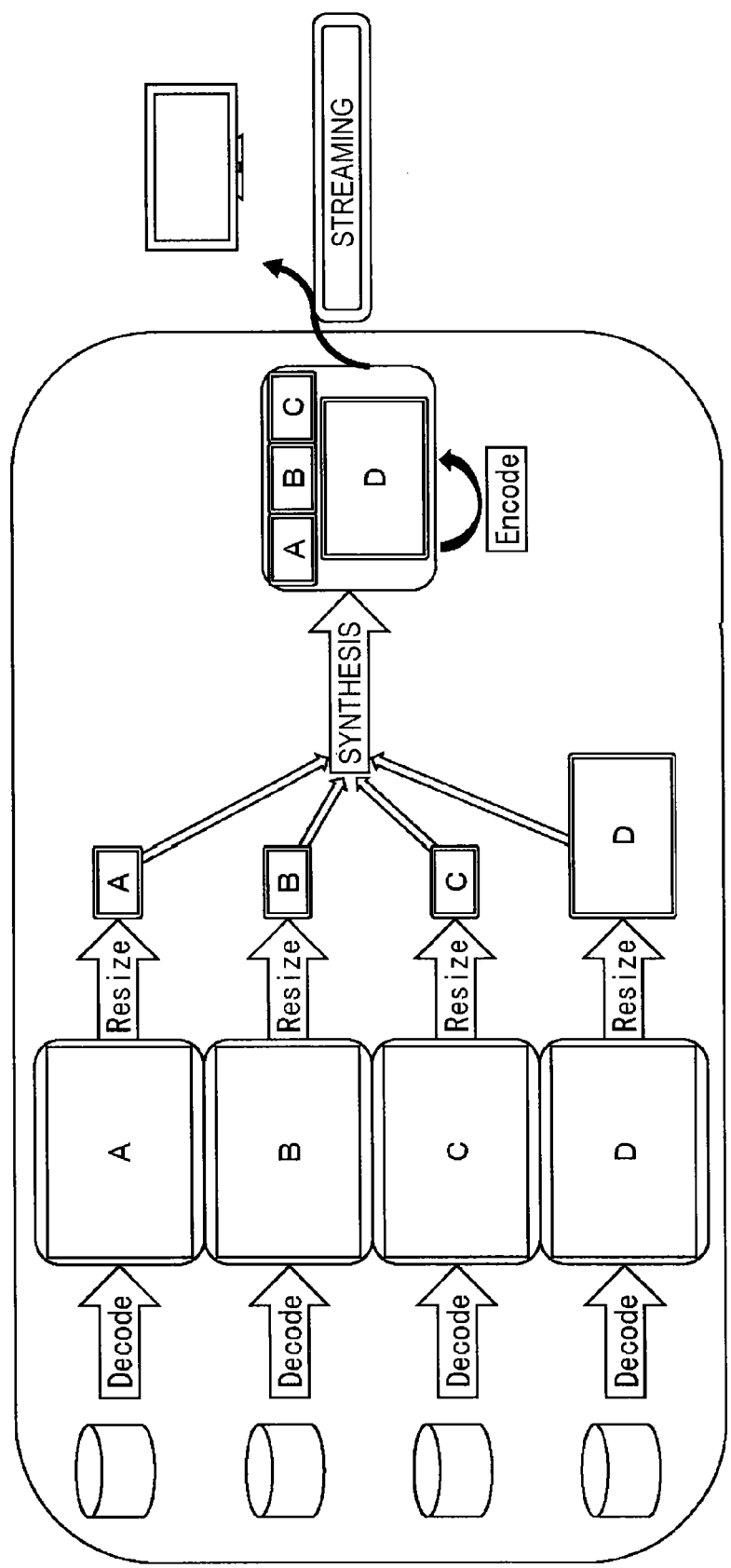
FIG. 2 is a diagram showing an example of the case in which a multi-picture reproduction image is distributed as one encoded stream.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

[Configuration Example of Multi-Picture Reproduction System]

Figure 3:
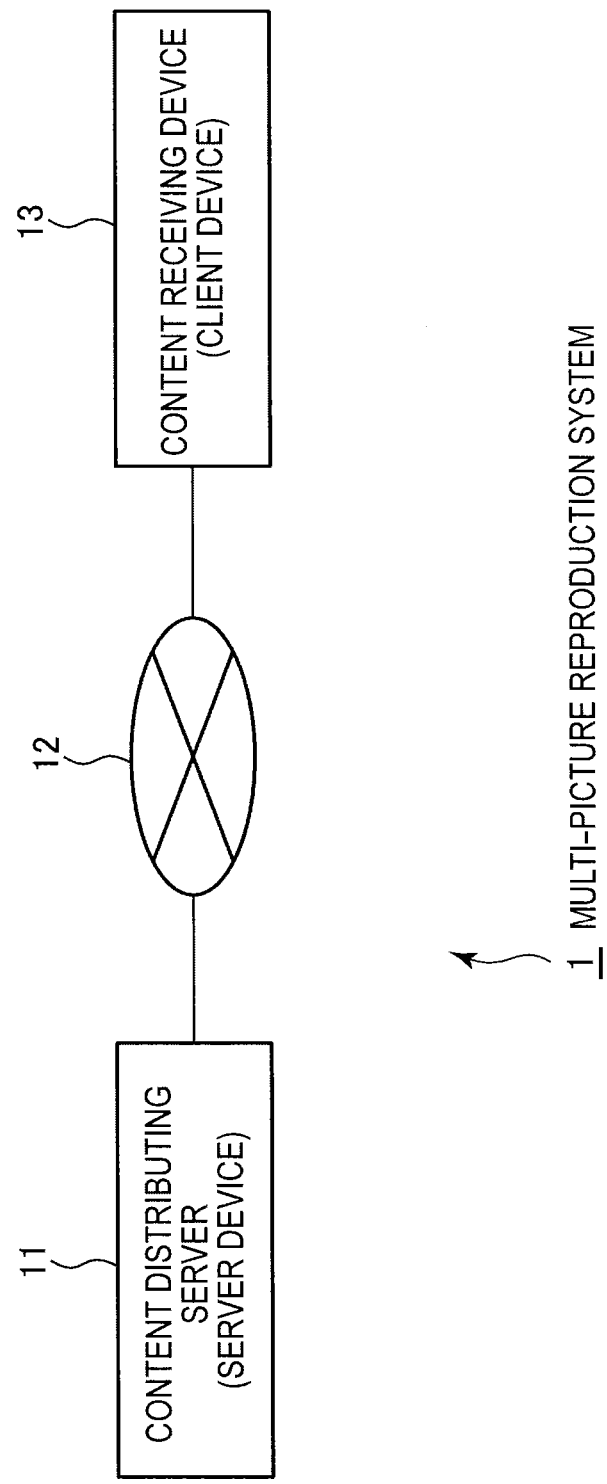
FIG. 3 is a block diagram showing a configuration example of an embodiment of a multi-picture reproduction system to which the present disclosure is applied.

FIG. 3 shows a configuration example of an embodiment of a multi-picture reproduction system to which the present disclosure is applied.

A multi-picture reproduction system 1 that is an image processing system is configured using a content distributing server 11 that distributes picture contents and a content receiving device 13 that is connected to the content distributing server 11 through a network 12.

The content distributing server 11 synthesizes a plurality of picture contents with a multi-picture reproduction image of one screen and distributes the multi-picture reproduction image as one encoded stream to the content receiving device 13 to be a client. The content receiving device 13 receives the encoded stream distributed by the content distributing server 11 through the network 12 such as the Internet. The content receiving device 13 displays the multi-picture reproduction image based on the received encoded stream on a display unit such as a liquid crystal display included in its own content receiving device or a display device connected to its own content receiving device. The content receiving device 13 can be configured using a television receiver having a network connection function, a set top box (STV), or a personal computer.

FIG. 3 shows only one content receiving device 3. However, a plurality of content receiving devices 13 are connected to the network 12 and the content distributing server 11 transmits the encoded stream to the plurality of content receiving devices 13 with multicasting.

[Method of Generating Multi-Picture Reproduction Image]

Using the case in which a multi-picture reproduction image to display four picture contents A, B, C, and D at the same time is generated as an example, a method of generating a multi-picture reproduction image by the content distributing server 11 will be described with reference to FIG. 4.

The content distributing server 11 encodes each of a plurality of picture contents to be distributed with a plurality of kinds of display sizes using a predetermined encoding method such as AVC (MPEG4 Part 10 (Advanced Video Coding)), previously generates a plurality of encoded streams in which display sizes are different, and stores the encoded streams. For example, the content distributing server 11 generates encoded streams of sizes of large, medium, and small, with respect to the picture content A. Similarly, the content distributing server 11 generates encoded streams of sizes of large, medium, and small, with respect to the picture contents, B, C, and D. Hereinafter, the sizes of large, medium, and small are described as a size (large), a size (medium), and a size (small), respectively. The size (large) is a size that corresponds to a screen size. Kinds of the sizes are previously determined.

Figure 4:
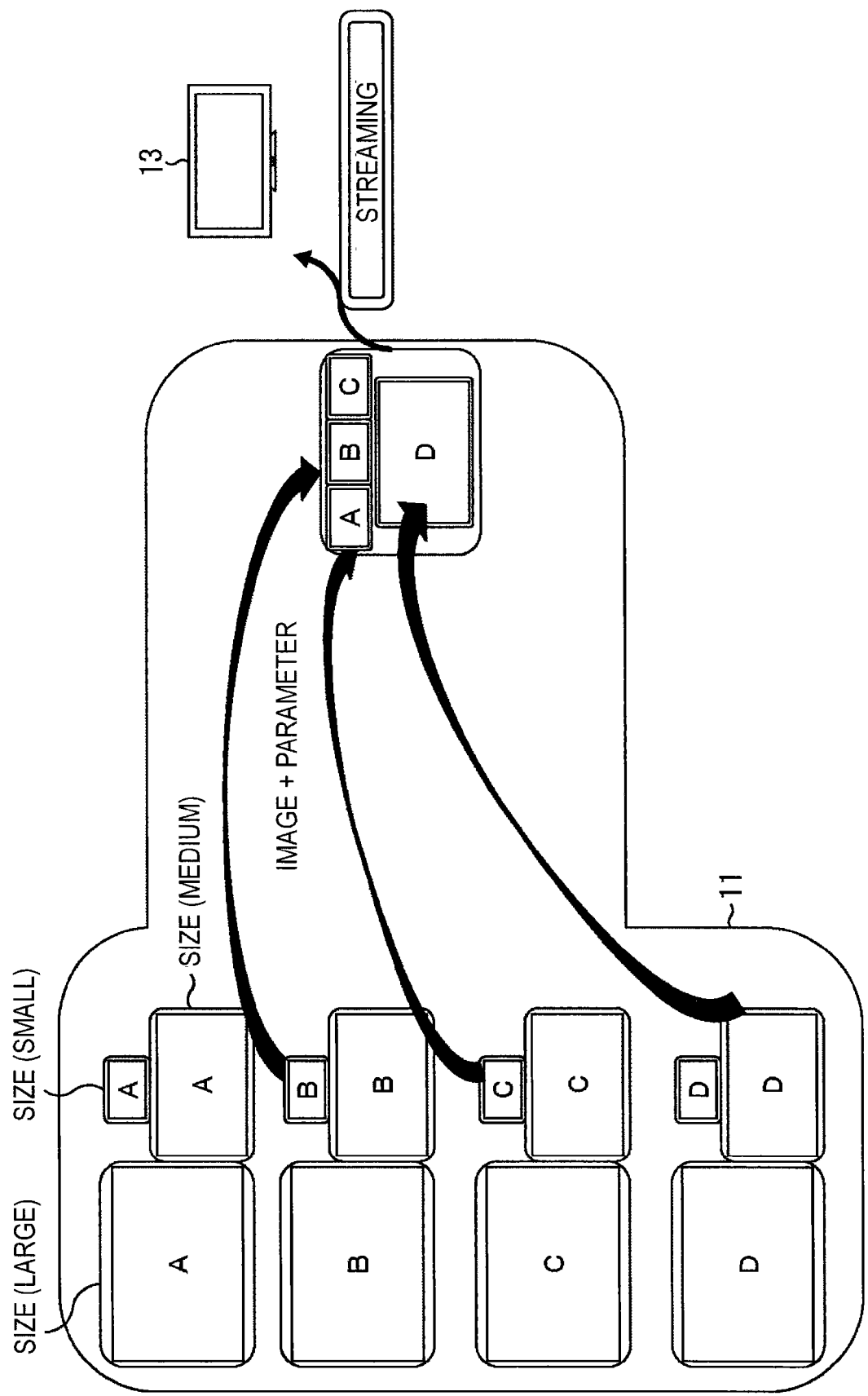
FIG. 4 is a diagram showing a method of generating a multi-picture reproduction image to which the present disclosure is applied.

As shown in FIG. 4, when a multi-picture reproduction image including the picture contents A, B, and C of the sizes (small) and the picture content D of the size (medium) is generated, the content distributing server 11 generates the multi-picture reproduction image using the plurality of encoded streams of the different sizes to be previously generated.

Specifically, the content distributing server 11 switches encoded streams of the predetermined sizes of a plurality of picture contents to be synthesis objects according to an arrangement (display position) of a screen, performs parameter transcoding, and generates an encoded stream of a multi-picture reproduction image to be distributed.

In this case, the parameter transcoding is encoding processing for performing encoding using parameters relating to encoding added to encoded data of picture contents in encoded streams of processing objects, without executing intra/inter type determination processing, block size determination processing, motion vector calculation processing, and intra prediction mode determination processing. The parameters are type information (an intra type and an inter type) of a macro block (MB), block size information of a prediction block, MV information showing a motion vector, and an intra prediction mode.

Figure 5:
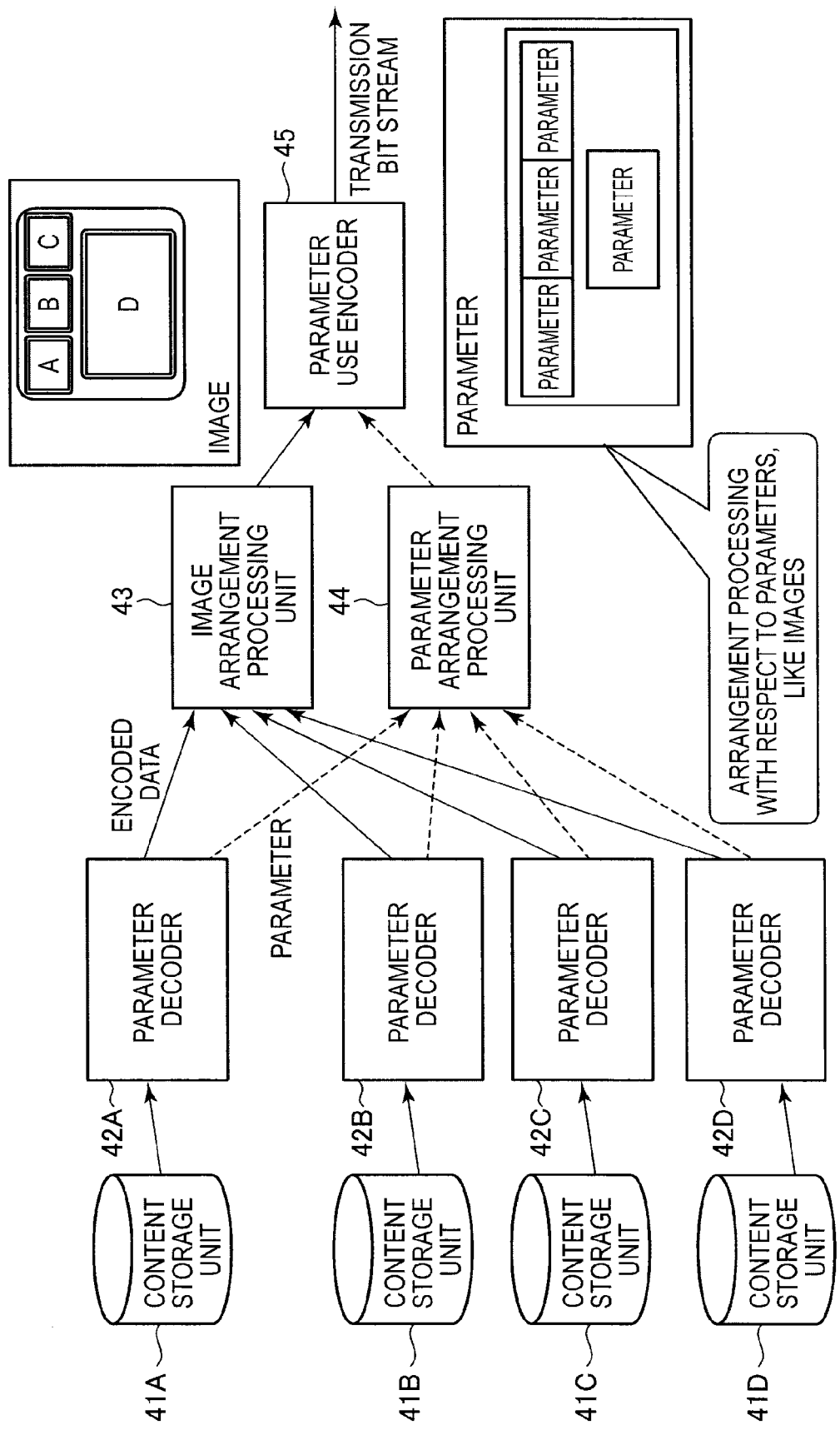
FIG. 5 is a conceptual functional block diagram of generation of a multi-picture reproduction image to which the present disclosure is applied.

FIG. 5 shows a conceptual functional block diagram of generation of a multi-picture reproduction image of the present disclosure using the parameter transcoding.

In a content storage unit 41A such as a hard disk, the encoded streams of the size (large), the size (medium), and the size (small) that are generated previously with respect to the picture content A are stored. In a content storage unit 41B, the encoded streams of the picture content B of the size (large), the size (medium), and the size (small) are stored. Similarly, in a content storage unit 41C and a content storage unit 41D, the encoded streams of the picture content C and the picture content D of the size (large), the size (medium), and the size (small) are stored.

When a multi-picture reproduction image including the picture contents A, B, and C of the size (small) and the picture content D of the size (medium) is generated, a parameter decoder 42A acquires the encoded stream of the size (small) of the picture content A from the content storage unit 41A. The parameter decoder 42A extracts the encoded data and the parameter from the input encoded stream, supplies the encoded data to an image arrangement processing unit 43, and supplies the parameter to a parameter arrangement processing unit 44.

A parameter decoder 42B acquires the encoded stream of the size (small) of the picture content B from the content storage unit 41B. The parameter decoder 42B extracts the encoded data and the parameter from the input encoded stream, supplies the encoded data to the image arrangement processing unit 43, and supplies the parameter to the parameter arrangement processing unit 44.

Processing of a parameter decoder 42C is the same as processing of the parameter decoder 42B, except that the encoded stream of the processing object is the encoded stream of the size (small) of the picture content C.

A parameter decoder 42D acquires the encoded stream of the size (medium) of the picture content D from the content storage unit 41D. The parameter decoder 42D extracts the encoded data and the parameter from the input encoded stream, supplies the encoded data to the image arrangement processing unit 43, and supplies the parameter to the parameter arrangement processing unit 44.

When the image arrangement processing unit 43 divides the multi-picture reproduction image into units of predetermined macro blocks and pays attention to each macro block, the image arrangement processing unit 43 switches image data to be output to a parameter use encoder 45 of a later step according to a picture content arranged at a position of each macro block.

That is, when the position of the attention macro block is a region in which the picture content A is arranged in the generated multi-picture reproduction image, the image arrangement processing unit 43 outputs the encoded data supplied from the parameter decoder 42A to the parameter use encoder 45.

When the position of the attention macro block is a region in which the picture content B is arranged in the generated multi-picture reproduction image, the image arrangement processing unit 43 outputs the encoded data supplied from the parameter decoder 42B to the parameter use encoder 45. This is the same in regions in which the picture contents C and D are arranged.

The parameter arrangement processing unit 44 executes the same processing as the image arrangement processing unit 43 with respect to the parameter.

That is, when the position of the attention macro block is a region in which the picture content A is arranged in the generated multi-picture reproduction image, the parameter arrangement processing unit 44 outputs the parameter supplied from the parameter decoder 42A to the parameter use encoder 45.

When the position of the attention macro block is a region in which the picture content B is arranged in the generated multi-picture reproduction image, the parameter arrangement processing unit 44 outputs the parameter supplied from the parameter decoder 42B to the parameter use encoder 45. This is the same in regions in which the picture contents C and D are arranged.

When the position of the attention macro block is a region in which the picture content A is arranged in the generated multi-picture reproduction image, the encoded data and the parameter of the picture content A are supplied to the parameter use encoder 45. When the position of the attention macro block is a region in which the picture content B is arranged, the encoded data and the parameter of the picture content B are supplied to the parameter use encoder 45. This is the same in regions in which the picture contents C and D are arranged.

The parameter use encoder 45 adds a parameter to the encoded data based on the supplied parameter, performs the parameter transcoding, and generates an encoded stream of a multi-picture reproduction image.

In FIG. 5, the content storage units 41A to 41D are described as the different content storage units to facilitate understanding. However, the content storage units 41A to 41D may be the same content storage unit 41. Similarly, the processing executed by the parameter decoders 42A to 42D may be executed by one parameter decoder 42. The content storage units 41A to 41D may be provided in the content distributing server 11 and may be provided in a device different from the content distributing server 11.

In brief, in the macro block of the position at which the picture content A is arranged in the generated multi-picture reproduction image, the content distributing server 11 performs the parameter transcoding from the encoded stream of the picture content A. In the macro block of the position at which the picture content B is arranged, the content distributing server 11 performs the parameter transcoding from the encoded stream of the picture content B. Similarly, in the macro block of the position at which the picture content C or D are arranged, the content distributing server 11 performs the parameter transcoding from the encoded streams of the picture content C or D.

The content distributing server 11 basically performs the parameter transcoding with respect to the encoded streams of the picture contents. However, it may be necessary to perform normal decoding and reencoding by the content distributing server 11.

Figure 6:
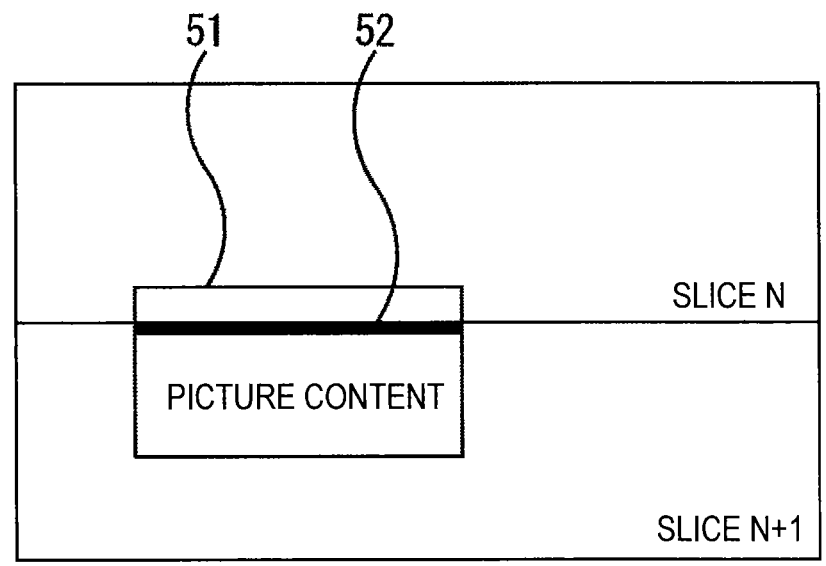
FIG. 6 is a diagram showing boundaries of slices of a picture content and a multi-picture reproduction image.

The multi-slicing may be applied in the encoded streams to improve operation efficiency of encoding or accept a demand from a reproduction side. In this case, as shown in FIG. 6, a boundary 51 of a slice of the picture content and a boundary 52 of a slice of the multi-picture reproduction image may not match.

In this case, there is a parameter such as an intra prediction mode prohibited by the encoding standard (hereinafter called a prohibition parameter), with respect to the prediction block positioned at the boundary of the slice or the frame. For example, in the AVC standard, block sizes of prediction blocks are 4×4 pixels, 8×8 pixels, and 16×16 pixels and a plurality of kinds of intra prediction modes showing prediction directions are defined for each size. Because a reference pixel does not logically exist with respect to some intra prediction modes among the intra prediction modes, use of the prediction modes is prohibited with respect to the predict block that is positioned at the boundary of the slice or the frame. For example, use of a vertical mode is prohibited with respect to the prediction block in which the upper side is positioned at the boundary of the slice or the frame.

When the boundary 52 and the boundary 51 do not match, the prediction block of the picture content that is positioned at the boundary 52 is not positioned at the boundary on the picture content. Therefore, the parameter of the prediction block may be the prohibition parameter.

Therefore, when the prohibition parameter is included in the parameters of the macro block positioned at the boundary 52, the content distributing server 11 should decode the encoded stream of the macro block and perform reencoding, such that the prohibition parameter is not included.

Figure 7:
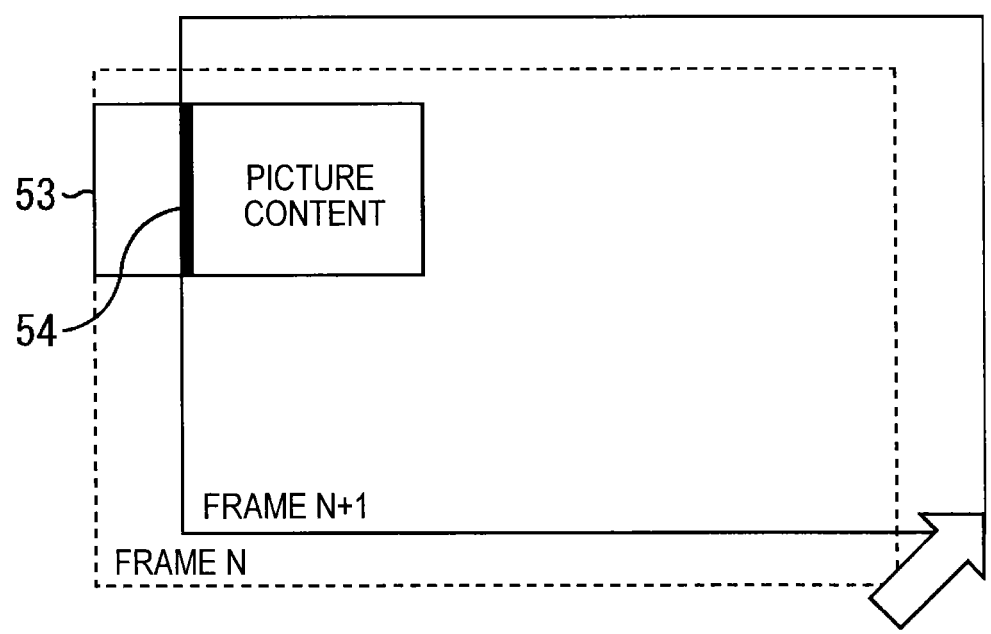
FIG. 7 is a diagram showing boundaries of frames of a picture content and a multi-picture reproduction image.

As shown in FIG. 7, when a display range of the multi-picture reproduction image moves, the picture content may protrude partially from the screen of the multi-picture reproduction image. In this case, a boundary 53 of a frame of the picture content and a boundary 54 of a frame of the multi-picture reproduction image do not match and the parameter of the prediction block of the picture content that is positioned at the boundary 54 may be the prohibition parameter, similar to the case of FIG. 6.

Therefore, when the prohibition parameter is included in the parameters of the macro block positioned at the boundary 54, the content distributing server 11 should decode the encoded stream of the macro block and perform reencoding, such that the prohibition parameter is not included, similar to the case of FIG. 6.

When the display position of the picture content is changed by the movement of the display range of the multi-picture reproduction image, a reference pixel of a multi-picture reproduction image of other frames based on the motion vector of the macro block of the inter type is different from a pixel to be referenced originally. Therefore, when the reencoding is performed using the reference pixel, block noise in which deterioration is viewed may be subjectively generated in the multi-picture reproduction image. The content distributing server 11 corrects the motion vector on the basis of the change of the display position of the picture content, such that the pixel to be referenced originally is referenced.

Figure 8:
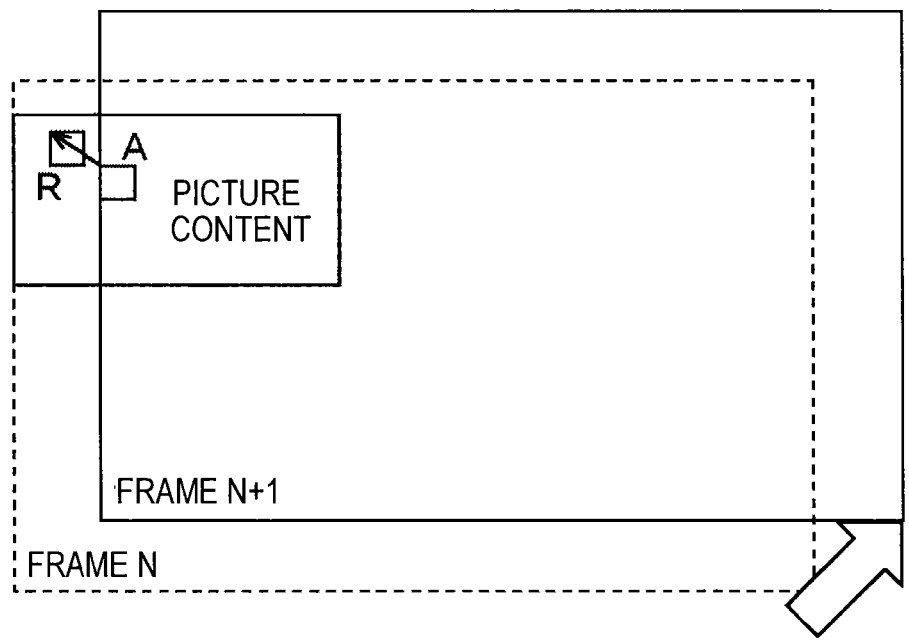
FIG. 8 is a diagram showing a reference pixel when a display position of a picture content is changed.

However, even when the motion vector is corrected, as shown in FIG. 8, the reference pixel may protrude to the outside of the screen of the multi-picture reproduction image. Therefore, in this case, the content distributing server 11 should decode the encoded stream and perform the reencoding, such that there is the reference pixel in the screen of the multi-picture reproduction image.

Figure 9:
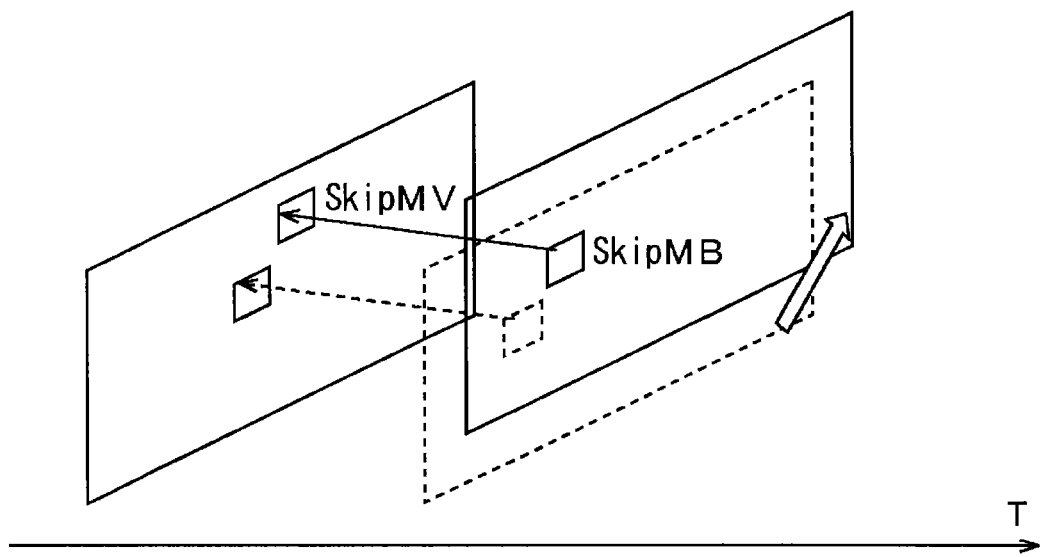
FIG. 9 is a diagram showing a reference pixel of a skip macro block when a display position of a picture content is changed.

When the macro block is a skip macro block, as shown in FIG. 9, a reference pixel of a multi-picture reproduction image of other frames based on the motion vector corresponding to the skip macro block is different from the pixel to be referenced originally, similar to the case of FIG. 8. Therefore, similar to the case of FIG. 8, the content distributing server 11 should correct the motion vector on the basis of the change of the display position of the picture content or decode the encoded stream and perform the reencoding, such that there is the reference pixel in the screen of the multi-picture reproduction image.

Figure 10:
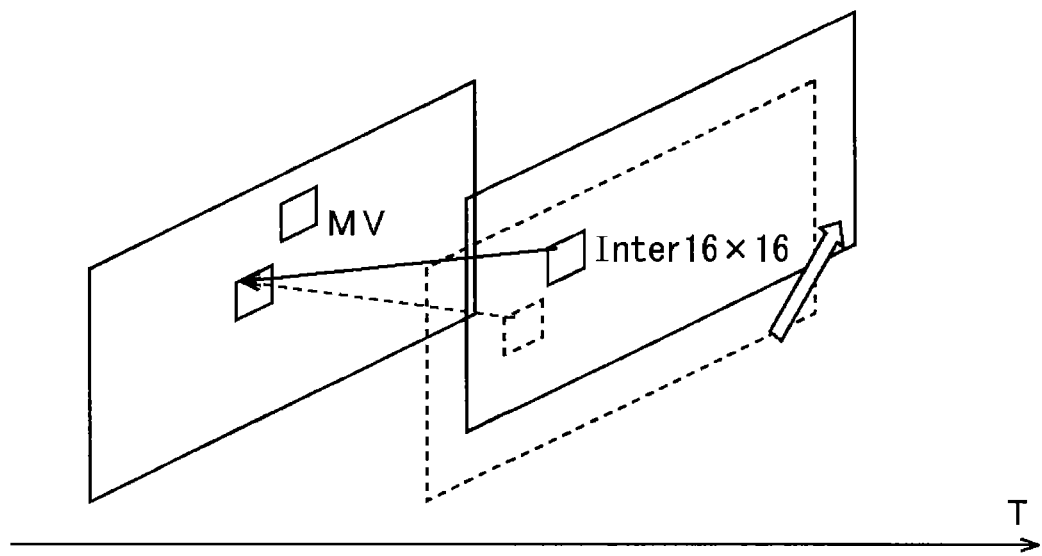
FIG. 10 is a diagram showing a change of a parameter when a display position of a picture content is changed.

If the motion vector is corrected or the reencoding is performed, the motion vector of the macro block that becomes the skip macro block is different from the motion vector that corresponds to the skip macro block. For this reason, as shown in FIG. 10, the MV information should be changed to the motion vector and the block size information should be changed to 16×16 pixels.

Figure 11:
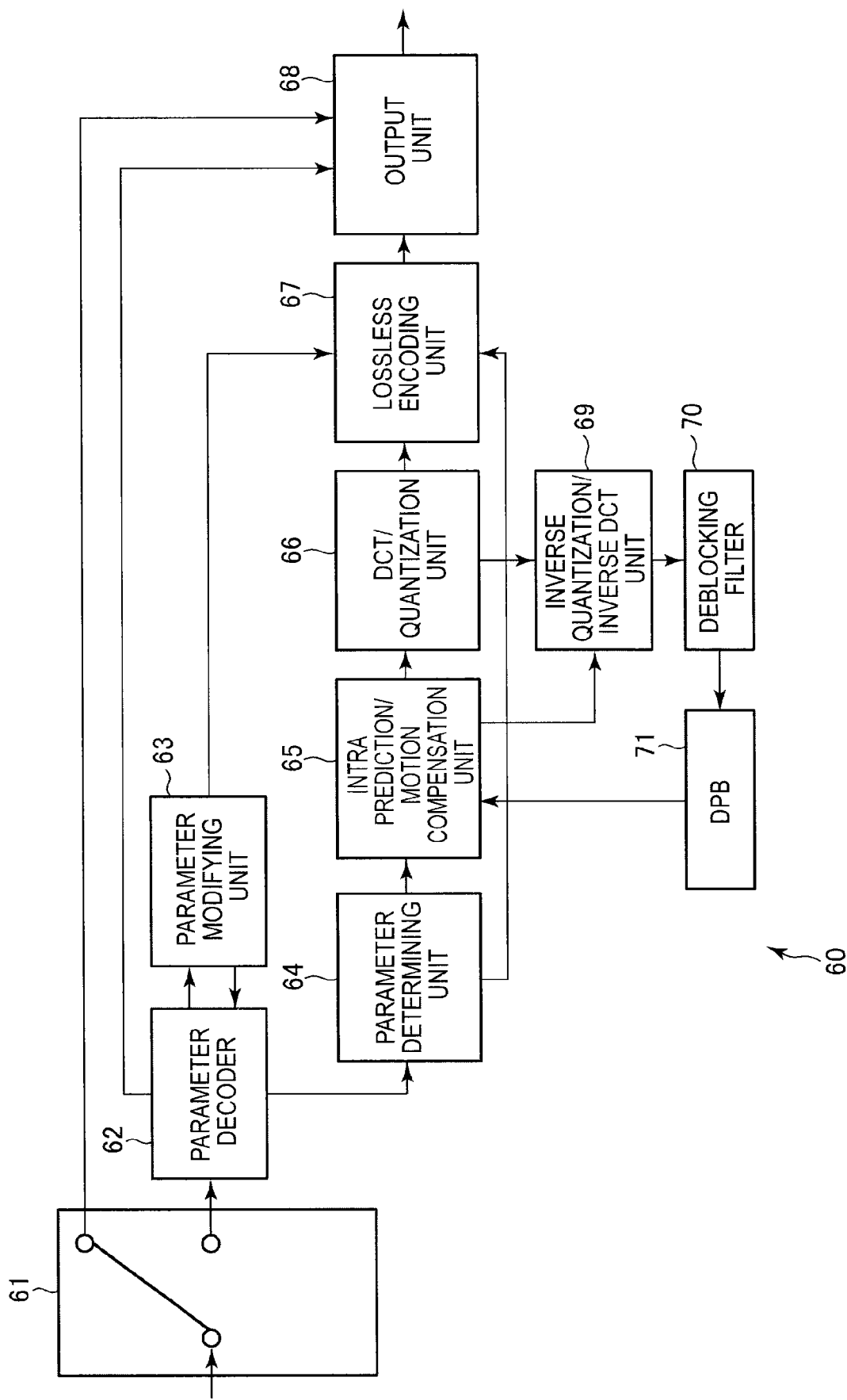
FIG. 11 is a functional block diagram of an encoding processing unit.

FIG. 11 shows a functional block diagram of an encoding processing unit 60 that performs the parameter transcoding of the content distributing server 11 of FIG. 3 in units of macro blocks.

The encoding processing unit 60 of FIG. 11 includes a switch 61, a parameter decoder 62, a parameter modifying unit 63, a parameter determining unit 64, an intra prediction/motion compensation unit 65, a DCT/quantization unit 66, a lossless encoding unit 67, an output unit 68, an inverse quantization/inverse DCT unit 69, a deblocking filter 70, and a decoded picture buffer (DPB) 71.

The encoded streams of the predetermined sizes of the picture contents forming the multi-picture reproduction image to be previously generated are input to the switch 61 in units of blocks (hereinafter called original blocks) of the picture content corresponding to the macro block of the multi-picture reproduction image. The switch 61 functions as a receiving unit, receives display information showing a movement instruction (change instruction) of a display range with respect to the multi-picture reproduction image from the user, and determines whether it is necessary to extract a parameter of the original block on the basis of the display information.

When it is determined that it is not necessary to extract the parameter of the original block, the switch 61 supplies the encoded stream of the original block to the output unit 68. Meanwhile, when it is determined that it is necessary to extract the parameter of the original block, the switch 61 supplies the encoded stream of the original block to the parameter decoder 62.

The parameter decoder 62 extracts the parameter of the original block from the encoded streams of a unit of the original block supplied from the switch 61. The parameter decoder 62 determines whether it is necessary to modify the parameter of the original block on the basis of the parameter of the original block, the display information, and whether the macro block is positioned at the boundary of the slice or the frame on the multi-picture reproduction image and the parameter of the original block is the prohibition parameter.

When it is determined that it is not necessary to modify the parameter of the original block, the parameter decoder 62 supplies the encoded stream of the original block to the output unit 68. When it is determined that it is necessary to modify the parameter of the original block, the parameter decoder 62 determines whether it is necessary to perform the reencoding on the basis of the parameter of the original block, the display information, and whether the macro block is positioned at the boundary of the slice or the frame on the multi-picture reproduction image and the parameter of the original block is the prohibition parameter. The parameter decoder 62 extracts the encoded data from the encoded streams.

When it is determined that it is not necessary to perform the reencoding, the parameter decoder 62 supplies the parameter and the encoded data of the original block to the parameter modifying unit 63. Meanwhile, when it is determined that it is necessary to perform the reencoding or when the reencoding is requested from the parameter modifying unit 63, the parameter decoder 62 decodes the encoded data of the original block and supplies the obtained image data to the parameter determining unit 64.

The parameter modifying unit 63 modifies (updates) the MV information of the parameter of the original block supplied from the parameter decoder 62 on the basis of the movement amount corresponding to the movement instruction shown by the display information. The parameter modifying unit 63 determines whether there is a reference pixel in the screen of the multi-picture reproduction image based on the modified parameter. When it is determined that there is the reference pixel in the screen of the multi-picture reproduction image, the parameter modifying unit 63 supplies the modified parameter and the encoded data to the lossless encoding unit 67.

Meanwhile, when it is determined that the reference pixel is not in the screen of the multi-picture reproduction image, the parameter modifying unit 63 requests the parameter decoder 62 to supply the image data of the original block to the parameter determining unit 64.

The parameter determining unit 64 determines a parameter on the basis of the image data of the original block supplied from the parameter decoder 62. Specifically, the parameter determining unit 64 executes intra prediction processing and motion compensation processing with respect to the image data of the original block supplied from the parameter decoder 62, similar to the intra prediction/motion compensation unit 65, and generates prediction image data. The parameter determining unit 64 determines a parameter used when prediction image data having a smallest encoding cost is generated as a final parameter.

The parameter determining unit 64 supplies the determined parameter and the image data to the intra prediction/motion compensation unit 65 and supplies the parameter to the lossless encoding unit 67.

The intra prediction/motion compensation unit 65 refers to the decoded image data stored in the DPB 71 on the basis of the parameter from the parameter determining unit 64, and executes the intra prediction processing or motion compensation processing with respect to the image data from the parameter determining unit 64. The intra prediction/motion compensation unit 65 supplies the intra prediction data and the image data to the DCT/quantization unit 66 and supplies the prediction image data to the inverse quantization/inverse DCT unit 69.

The DCT/quantization unit 66 calculates the difference of the prediction image data and the image data supplied from the intra prediction/motion compensation unit 65. The DCT/quantization unit 66 executes orthogonal transform with respect to the obtained differential image data and executes DCT processing for calculating a transform coefficient. The DCT/quantization unit 66 executes quantization processing for quantizing the calculated transform coefficient. The DCT/quantization unit 66 supplies the image data after the quantization processing to the lossless encoding unit 67.

The lossless encoding unit 67 executes lossless encoding such as variable length coding and arithmetic coding, with respect to the quantized image data supplied from the DCT/quantization unit 66. As the variable length coding, there is CAVLC (Context-Adaptive Variable Length Coding) determined by an H. 264/AVC method. As the arithmetic coding, there is CABAC (Context-Adaptive Binary Arithmetic Coding). The lossless encoding unit 67 adds the parameter supplied from the parameter determining unit 64 or the parameter modifying unit 63 to the encoded data obtained as the result of the lossless encoding or the encoded data from the parameter modifying unit 63. The lossless encoding unit 67 supplies the obtained encoded stream to the output unit 68.

The output unit 68 outputs the encoded stream in units of the original blocks supplied from the lossless encoding unit 67 or the encoded stream in units of the original blocks supplied from the switch 61 as the encoded stream in units of macro blocks of the multi-picture reproduction image.

The inverse quantization/inverse DCT unit 69 inversely quantizes the quantized transform coefficient supplied from the DCT/quantization unit 66 and executes inverse orthogonal transform with respect to the obtained transform coefficient. In other words, the inverse quantization/inverse DCT unit 69 executes the inverse quantization processing and the inverse DCT processing using a method corresponding to the DCT processing and the quantization processing executed by the DCT/quantization unit 66. The inverse quantization/inverse DCT unit 69 adds the differential image data obtained as the result of the inverse orthogonal transform and the prediction image data supplied from the intra prediction/motion compensation unit 65 and supplies the obtained image data as the decoded image data to the deblocking filter 70.

The deblocking filter 70 executes deblocking processing to remove block distortion with respect to the decoded image data supplied from the inverse quantization/inverse DCT unit 69. The deblocking filter 70 supplies the decoded image data on which the deblocking processing is executed or the decoded image data on which the deblocking processing is not executed to the DPB 71.

The DPB 71 stores the decoded image data that is supplied from the deblocking filter 70.

As described above, when it is determined that it is not necessary to extract the parameter or when it is determined that it is not necessary to modify the parameter, the encoding processing unit 60 outputs the input encoded stream as the encoded stream of the multi-picture reproduction image and performs the parameter transcoding. Hereinafter, this parameter transcoding is called non-modification parameter transcoding.

When it is determined that it is necessary to modify the parameter, when it is determined that it is not necessary to perform the reencoding, and when it is determined that there is the reference pixel in the screen of the multi-picture reproduction image, the encoding processing unit 60 modifies only the parameter included in the input encoded streams and performs the parameter transcoding. Hereinafter, this parameter transcoding is called modification parameter transcoding. Meanwhile, when the reference pixel is not in the screen of the multi-picture reproduction image or when the encoding processing unit 60 determines that it is necessary to modify the parameter and determines that it is necessary to perform reencoding, the encoding processing unit 60 decodes the encoded stream and performs the reencoding.

[Flowchart of Channel List Update Processing]

Figure 12:
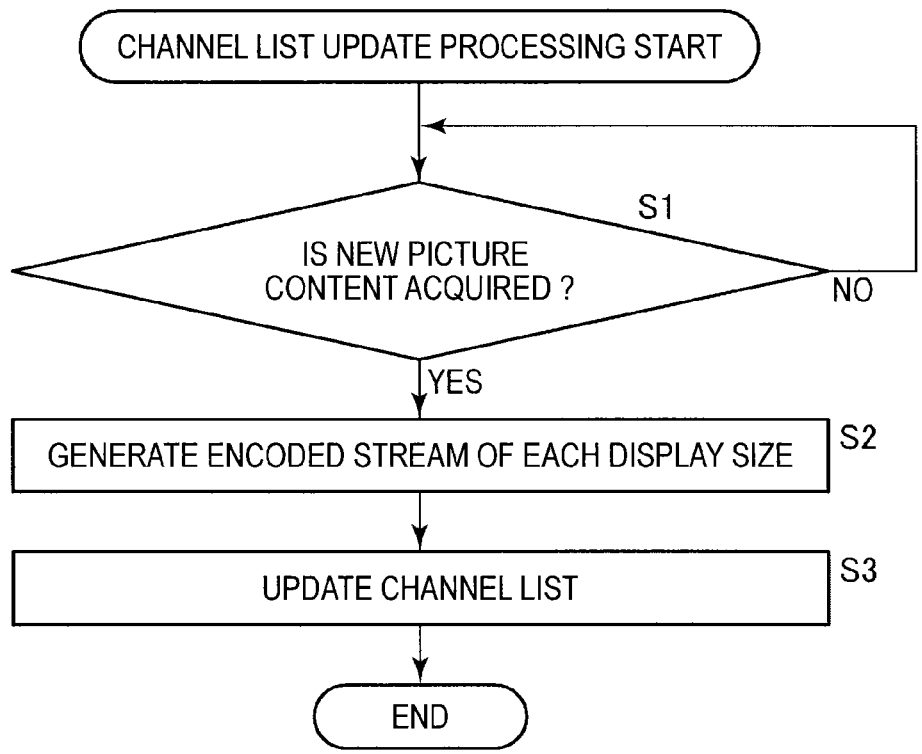
FIG. 12 is a flowchart showing channel list update (generation) processing.

FIG. 12 is a flowchart of channel list update (generation) processing that is executed when the content distributing server 11 acquires a new picture content.

In this processing, first, in step S1, the content distributing server 11 determines whether a new picture content is acquired and repeats processing of step S1 until it is determined that the new picture content is acquired.

In step S1, when it is determined that the new picture content is acquired, the processing proceeds to step S2 and the content distributing server 11 generates an encoded stream of the acquired new picture content with respect to each display size of the size (large), the size (medium), and the size (small).

In step S3, the content distributing server 11 adds information of the acquired new picture content to the channel list stored in the content storage unit 41 and updates the channel list. When the channel list is not in the content storage unit 41, the content distributing server 11 generates a channel list including the information of the acquired new picture content and stores the channel list in the content storage unit 41.

By the processing described above, the channel list update ends.

[Flowchart of Start Processing]

Figure 13:
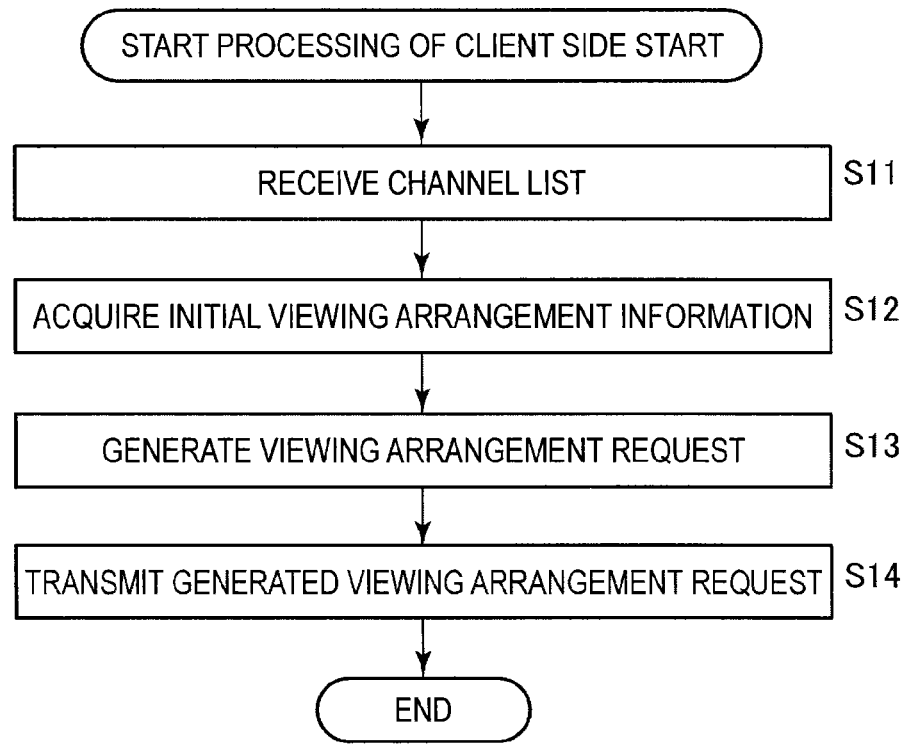
FIG. 13 is a flowchart showing start processing of a client side.

FIG. 13 is a flowchart of start processing that is executed when the content receiving device 13 to be the client side starts.

In this processing, first, in step S11, the content receiving device 13 receives the channel list from the content distributing server 11. The content receiving device 13 may transmit a command to request transmission of the channel list and receive the channel list transmitted according to the command or receive the channel list transmitted regularly or irregularly.

In step S12, the content receiving device 13 acquires initial viewing arrangement information in which kinds and an arrangement of a plurality of picture contents first displayed as the multi-picture reproduction image are defined, from a setting storage unit not shown in the drawings. For example, when the content receiving device 13 is first started immediately after the content receiving device 13 is manufactured, initial viewing arrangement information that is stored previously in the setting storage unit is acquired. When the content receiving device 13 is started second and subsequent times, initial viewing arrangement information that corresponds to a final state when the multi-picture reproduction image is previously displayed is acquired.

In step S13, the content receiving device 13 generates a viewing arrangement request to request the content distributing server 11 to transmit the multi-picture reproduction image based on the acquired initial viewing arrangement information.

For example, the viewing arrangement request can be generated with the following format that includes the number of picture contents, content identifiers to identify the picture contents, and content regions (arrangement regions) to be display regions of the picture contents displayed by the diagonal coordinates.

[Content number (N), content 1 identifier, content 1 position (upper left x coordinate, upper left y coordinate, lower right x coordinate, and lower right y coordinate), content 2 identifier, content 2 position (upper left x coordinate, upper left y coordinate, lower right x coordinate, and lower right y coordinate), . . . , content N identifier, and content N position (upper left x coordinate, upper left y coordinate, lower right x coordinate, and lower right y coordinate)]

In step S14, the content receiving device 13 transmits the generated viewing arrangement request to the content distributing server 11 and ends the processing.

[Picture Content Change Processing]

Figure 14:
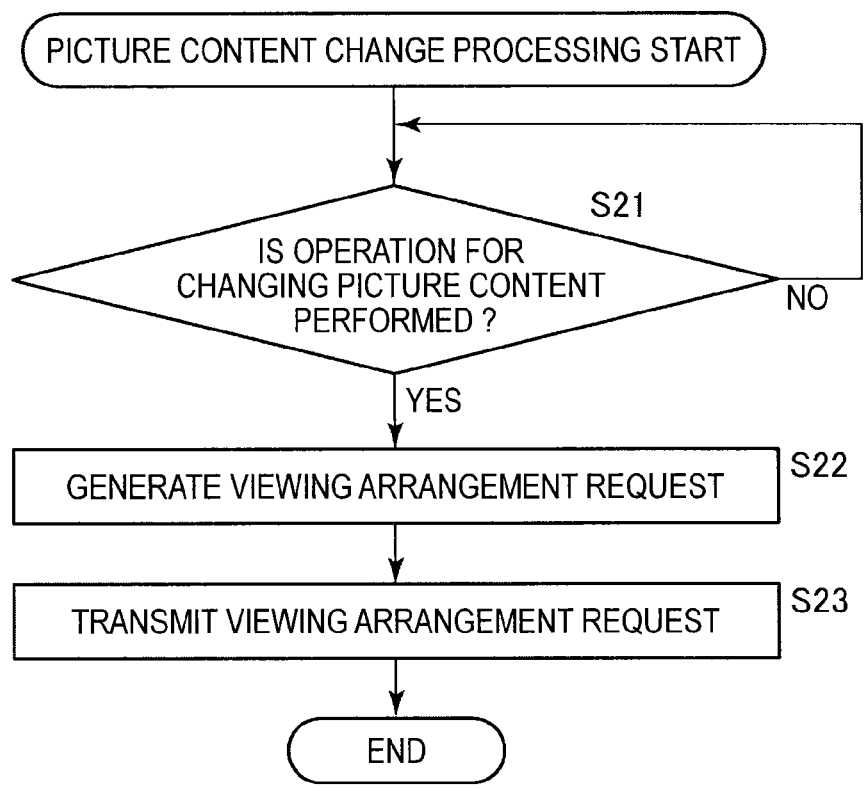
FIG. 14 is a flowchart showing picture content change processing.

FIG. 14 is a flowchart of picture content change processing that is executed when a predetermined change is made with respect to picture contents forming a multi-picture reproduction image after the multi-picture reproduction image is displayed in the content receiving device 13.

First, in step S21, the content receiving device 13 determines whether an operation for changing the picture content is performed and repeats the processing of step S21 until it is determined that the operation for changing the picture content is performed.

When it is determined that the operation for changing the picture content is performed in step S21, in step S22, the content receiving device 13 generates a viewing arrangement request corresponding to a configuration of the multi-picture reproduction image after the change.

In step S23, the content receiving device 13 transmits the generated viewing arrangement request to the content distributing server 11 and ends the processing.

[Viewing Arrangement Change Request Reception Processing]

Figure 15:
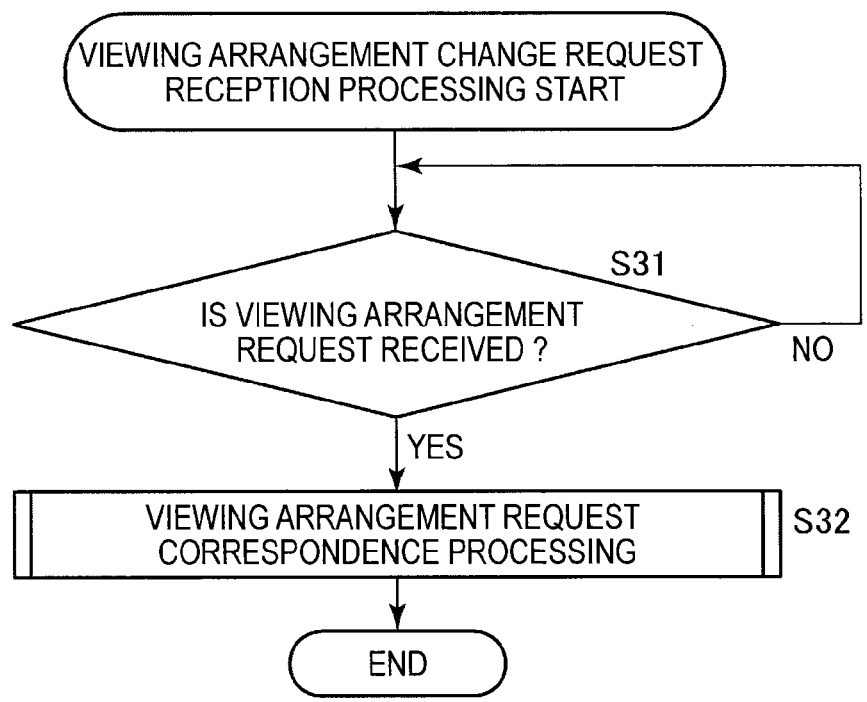
FIG. 15 is a flowchart showing viewing arrangement change request reception processing.

FIG. 15 is a flowchart of viewing arrangement change request reception processing that is executed by the content distributing server 11 with respect to the viewing arrangement change request transmitted from the content receiving device 13 by the processing of FIG. 13 or 14.

First, in step S31, the content distributing server 11 determines whether the viewing arrangement change request is received and repeats the processing of step S31 until it is determined that the viewing arrangement request is received.

In step S31, when it is determined that the viewing arrangement change request is received, the processing proceeds to step S32 and the content distributing server 11 executes viewing arrangement request correspondence processing for generating (changing) a multi-picture reproduction image according to the viewing arrangement change request and ends the processing.

[Viewing Arrangement Request Correspondence Processing]

Figure 16:
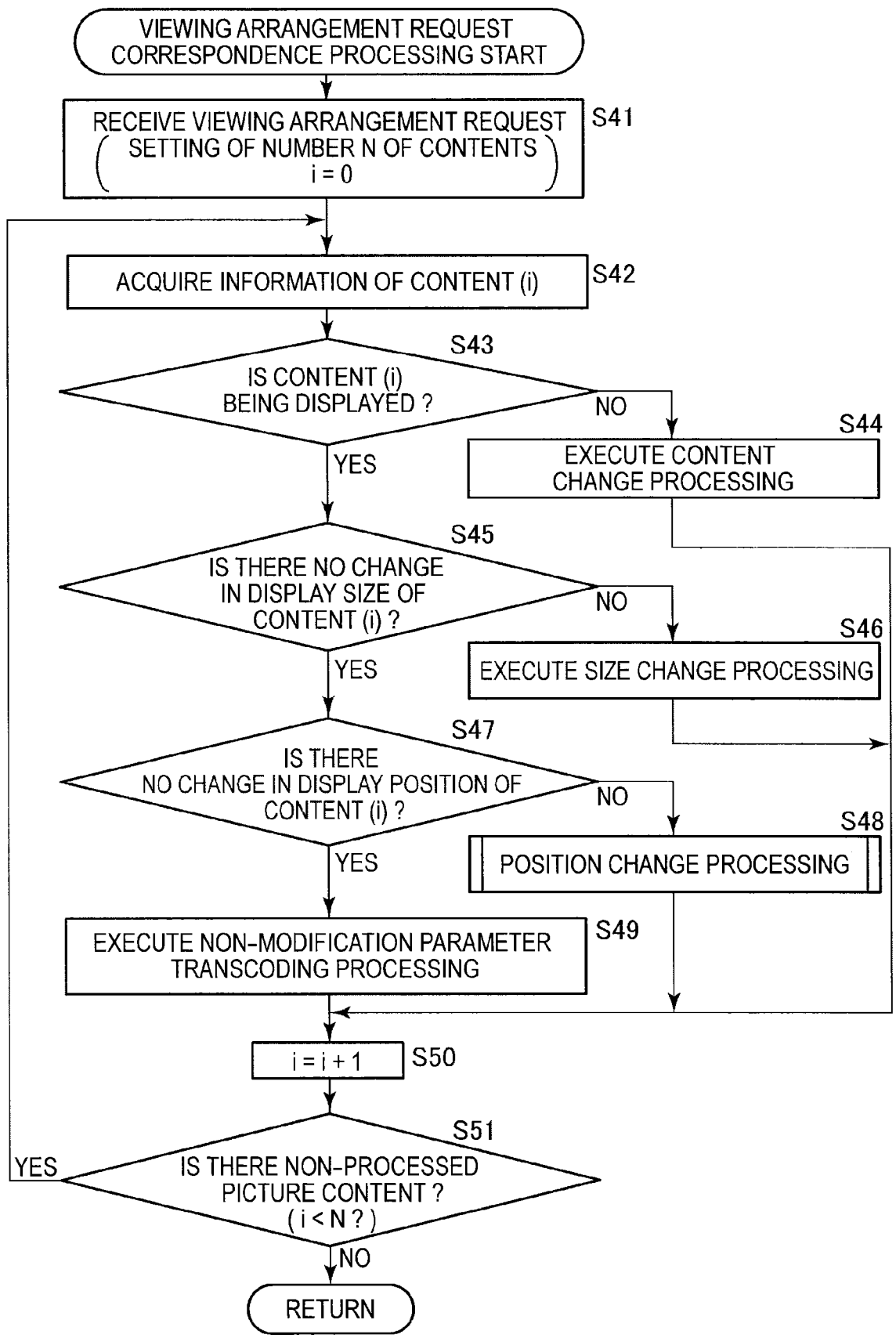
FIG. 16 is a flowchart showing viewing arrangement request correspondence processing.

FIG. 16 is a detailed flowchart of the viewing arrangement request correspondence processing that is executed in step S32 of FIG. 15.

In this processing, first, in step S41, the content distributing server 11 receives a viewing arrangement request that is transmitted from the content receiving device 13. In the viewing arrangement request, the number N of picture contents, content identifiers to identify the picture contents, and content regions (positions and sizes) of the picture contents are described. Therefore, the content distributing server 11 sets the number N of contents on the basis of the received viewing arrangement request, substitutes 0 for a variable i showing the picture content, and performs initialization.

In step S42, the content distributing server 11 acquires information of the i-th picture content (hereinafter called the content (i)). That is, the content distributing server 11 specifies the picture content by the content identifier and specifies the display position and the display size of the picture content with respect to the content (i) on the basis of the viewing arrangement request.

In step S43, the content distributing server 11 determines whether the content (i) is being displayed, that is, whether the content (i) is displayed in the multi-picture reproduction image before the viewing arrangement request is received.

In step S43, when it is determined that the content (i) is not being displayed, that is, that the content (i) is a picture content selected to be newly displayed, the processing proceeds to step S44 and the content distributing server 11 executes content change processing.

Meanwhile, in step S43, when it is determined that the content (i) is being displayed, that is, that the content (i) is displayed in the multi-picture reproduction image before the change, the processing proceeds to step S45. In step S45, the content distributing server 11 determines whether there is no change in the display size of the content (i).

In step S45, when it is determined that there is a change in the display size of the content (i), the processing proceeds to step S46 and the content distributing server 11 executes size change processing for changing the display size of the content (i).

Meanwhile, in step S45, when it is determined that there is no change in the display size of the content (i), the processing proceeds to step S47. In step S47, the content distributing server 11 determines whether there is no change in the display position of the content (i), that is, whether the display information is received.

In step S47, when it is determined that there is a change in the display position of the content (i), the processing proceeds to step S48 and the content distributing sever 11 executes position change processing for changing the display position of the content (i). In several frames (fields) when the image before changing the display position is referenced, it is determined that there is a change in the display position of the content (i) and the position change processing is executed.

Meanwhile, in step S47, when it is determined that there is no change in the display position of the content (i), the processing proceeds to step S49 and the content distributing server 11 executes non-modification parameter transcoding processing for performing non-modification parameter transcoding.

After the processing of steps S44, S46, S48, or S49, in step S50, the content distributing server 11 increments the variable i by 1 and advances the processing to step S51.

In step S51, the content distributing server 11 determines whether there is a non-processed picture content, that is, whether the variable i is smaller than the number N of contents.

In step S51, when it is determined that there is the non-processed picture content, that is, that the variable i is smaller than the number N of contents, the processing returns to step S42 and the following processing is repetitively executed. That is, the processing of steps S42 to S50 described above is executed with respect to a next picture content displayed on the multi-picture reproduction image.

Meanwhile, in step S51, when it is determined that there is no non-processed picture content, the viewing arrangement request correspondence processing ends and the processing returns to FIG. 15.

As described above, in the viewing arrangement request correspondence processing, the content distributing server 11 executes the processing corresponding to when the display position is changed, when the display size is changed, when the content is changed, and when there is no change.

Because there is no multi-picture reproduction image (picture content) before the change with respect to the viewing arrangement request first transmitted immediately after the content receiving device 13 to be the client side starts, the same processing as the processing of step S44 is executed with respect to all of the picture contents.

[Multi-Picture Reproduction Image Generation Processing in Units of Macro Blocks]

The viewing arrangement request correspondence processing that is described with reference to FIG. 6 is processing when generation of the multi-picture reproduction image is considered in units of picture contents.

Figure 17:
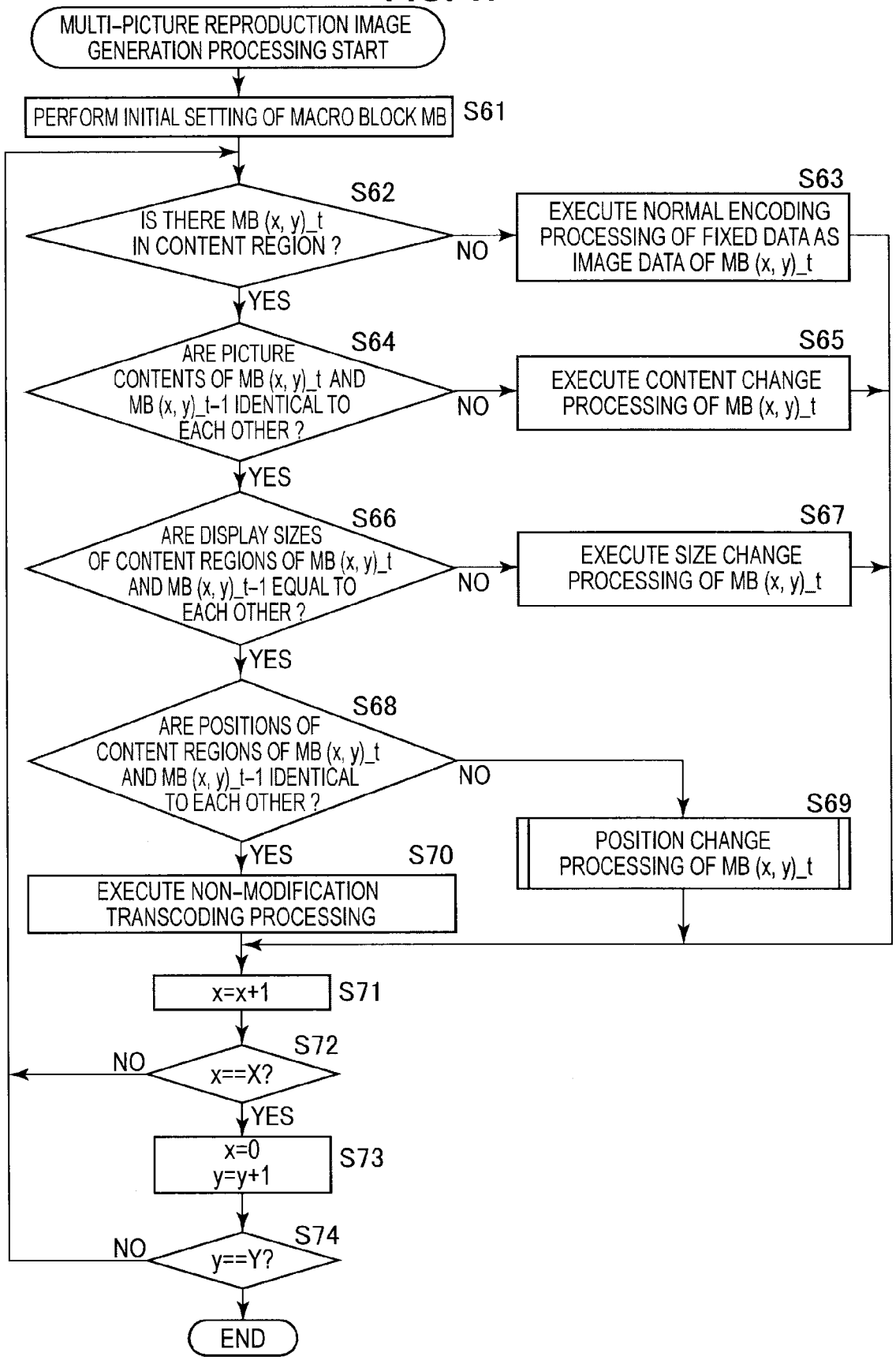
FIG. 17 is a flowchart showing multi-picture reproduction image generation processing.

Next, the processing when the generation of the multi-picture reproduction image is considered in units of macro blocks will be described with reference to FIG. 17. FIG. 17 is a flowchart of multi-picture reproduction image generation processing for generating a (t-th) multi-picture reproduction image at a time t. A generation (update) period of the multi-picture reproduction image is a field period.

First, in step S61, the encoding processing unit 60 of the content distributing server 11 performs initial setting of a macro block MB of a generated multi-picture reproduction image. Specifically, the encoding processing unit 60 sets "0" as initial values to variables x and y to specify a macro block MB of a processing object. In this embodiment, the multi-picture reproduction image is divided into X macro blocks in a horizontal direction and Y macro blocks in a vertical direction and the boundary of the macro block MB is at least matched with the boundary of a content region to be a region in which the picture contents are arranged. Hereinafter, the macro block MB in which the horizontal direction is the position of the variable x and the vertical direction is the position of the variable y is described as a macro block MB (x, y).

In step S62, the encoding processing unit 60 determines whether there is a macro block MB (x, y)_t of the time t1 in a content region to a region in which the picture contents are arranged.

In step S62, when it is determined that the macro block MB (x, y)_t of the time t is not in the content region, the processing proceeds to step S63 and the encoding processing unit 60 executes normal encoding processing with respect to fixed data as image data of the macro block MB (x, y)_t of the time t. That is, the fixed data is input as the image data of the macro block MB (x, y)_t to the parameter determining unit 64, the normal encoding processing is executed with respect to the fixed data by the intra prediction/motion compensation unit

65, the DCT/quantization unit 66, the lossless encoding unit 67, and the output unit 68, and the fixed data is output. The fixed data is image data to display a fixed black image.

Meanwhile, in step S62, when it is determined that the macro block MB (x, y)_t of the time t is in the content region, the processing proceeds to step S64. In step S64, the switch 61 of the encoding processing unit 60 determines whether the picture contents of the macro block MB (x, y)_t of the time t and the macro block MB (x, y)_t−1 of the time t−1 before the macro block MB (x, y)_t of the time t are identical to each other. In this case, that the picture contents are identical to each other at the time t and the time t−1 does not mean that the images are identical to each other but means that programs (contents) are identical to each other.

In step S64, when it is determined that the picture contents of the macro block MB (x, y)_t of the time t and the macro block MB (x, y)_t−1 of the time t−1 are not identical to each other, the switch 61 determines that it is necessary to extract the parameter. The switch 61 supplies the encoded stream of the macro block MB (x, y)_t to the parameter decoder 62. In step S65, the encoding processing unit 60 executes content change processing of the macro block MB (x, y)_t of the time t.

Specifically, when the picture content after the change is a live broadcasting content, the content distributing server 11 performs the encoding from a currently broadcasted picture of the picture content after the change. Therefore, when a picture type of an original block corresponding to the macro block MB (x, y)_t is a P picture, the encoding processing unit 60 reencodes the P picture as an I picture.

That is, the parameter decoder 62 determines that it is necessary to perform the reencoding and the parameter determining unit 64 sets the macro block MB (x, y)_t as the I picture and determines the parameter again. At this time, when the macro block MB (x, y)_t is positioned at the boundary of the frame or the slice, a parameter other than the prohibition parameter is determined as a new parameter. The intra prediction/motion compensation unit 65, the DCT/quantization unit 66, the lossless encoding unit 67, and the output unit 68 reencode the decoding result of the encoded data of the original block corresponding to the macro block MB (x, y)_t, using the parameter determined again, and output the obtained encoded stream.

Thereby, when the picture type of the macro block MB (x, y) is the P picture, high responsiveness can be realized, because it is not necessary to change the picture content until the P picture becomes the I picture.

The encoding processing unit 60 outputs the encoded stream of the original block as it is when the picture type of the original block corresponding to the macro block MB (x, y)_t is the I picture, the macro block MB (x, y)_t is not positioned at the boundary of the frame or the slice or the macro block MB (x, y)_t is positioned at the boundary of the frame or the slice, and the parameter is not the prohibition parameter.

That is, in this case, the parameter decoder 62 determines that it is not necessary to modify the parameter and supplies the encoded stream of the original block corresponding to the macro block MB (x, y)_t to the output unit 68. Thereby, the encoded stream of the original block that corresponds to the input macro block MB (x, y)_t is output as the encoded stream of the macro block MB (x, y)_t of the multi-picture reproduction image as it is.

Meanwhile, when the picture type of the original block corresponding to the macro block MB (x, y)_t is the I picture, the macro block MB (x, y)_t is positioned at the boundary of the frame or the slice, and the parameter is the prohibition parameter, the encoding processing unit 60 reencodes the encoded stream of the original block.

That is, in this case, the parameter decoder 62 determines that it is necessary to perform the reencoding and the parameter determining unit 64 determines the parameter of the macro block MB (x, y)_t as the parameter other than the prohibition parameter again. The intra prediction/motion compensation unit 65, the DCT/quantization unit 66, the lossless encoding unit 67, and the output unit 68 reencode the decoding result of the encoded data of the original block corresponding to the macro block MB (x, y)_t, using the parameter determined again, and output the obtained encoded stream.

When the picture type of the original block corresponding to the macro block MB (x, y)_t is a B picture, the encoding processing unit 60 does not execute all the processing but awaits the I picture or the P picture.

Meanwhile, when the picture content after the change is not the live picture broadcasting content, the content distributing server 11 performs the encoding from a head of the picture content. For this reason, the encoding processing unit 60 executes the same processing as the processing when the picture content after the change is the live broadcasting content and the picture type of the original block corresponding to the macro block MB (x, y)_t is the I picture.

In step S64, when it is determined that the picture contents of the macro block MB (x, y)_t of the time t and the macro block MB (x, y)_t−1 of the time t−1 are identical to each other, the processing proceeds to step S66. In step S66, the switch 61 determines whether the display sizes of the content regions of the picture contents of the macro block MB (x, y)_t of the time t and the macro block MB (x, y)_t−1 of the time t−1 are equal to each other.

In step S66, when it is determined that the display sizes of the content regions are not equal to each other, the switch 61 determines that it is necessary to extract the parameter. The switch 61 supplies the encoded stream of the original block corresponding to the macro block MB (x, y)_t to the parameter decoder 62. In step S67, the encoding processing unit 60 executes the size change processing of the macro block MB (x, y)_t of the time t. The size change processing is the same as the content change processing, except that the encoding object is the picture content in which the display size is changed.

Meanwhile, in step S66, when it is determined that the display sizes of the content regions are equal to each other, the processing proceeds to step S68. In step S68, the switch 61 determines whether the positions of the content regions of the macro block MB (x, y)_t of the time t and the macro block MB (x, y)_t−1 of the time t−1 are identical to each other.

In step S68, when it is determined that the positions of the content regions are not identical to each other, the switch 61 determines that it is necessary to extract the parameter and supplies the encoded stream of the original block corresponding to the macro block MB (x, y)_t to the parameter decoder 62. In step S69, the encoding processing unit 60 executes the position change processing of the picture content corresponding to the macro block MB (x, y)_t of the time t. The details of the position change processing of the macro block MB (x, y)_t will be described with reference to FIG. 18 to be described below.

Meanwhile, in step S68, when the positions of the content areas are identical to each other, the switch 61 determines that it is not necessary to extract the parameter and advances the processing to step S70. In step S70, the encoding processing unit 60 executes non-modification parameter transcoding processing with respect to the macro block MB (x, y)_t of the time t.

Specifically, when the macro block MB (x, y)_t is not positioned at the boundary of the slice or the frame on the multi-picture reproduction image, the switch 61 of the encoding processing unit 60 supplies the encoded stream of the original block corresponding to the input macro block MB (x, y)_t to the output unit 68. The output unit 68 outputs the encoded stream as the encoded stream of the macro block MB (x, y)_t of the multi-picture reproduction image as it is.

Meanwhile, when the macro block MB (x, y)_t is positioned at the boundary of the slice or the frame on the multi-picture reproduction image, the switch 61 determines that it is necessary to extract the parameter of the original block and supplies the encoded stream of the original block corresponding to the macro block MB (x, y)_t to the parameter decoder 62. When the parameter of the macro block MB (x, y)_t is the prohibition parameter, the parameter decoder 62 determines that it is necessary to perform the reencoding and the parameter determining unit 64 determines the parameter of the macro block MB (x, y)_t as the parameter other than the prohibition parameter again. The intra prediction/motion compensation unit 65, the DCT/quantization unit 66, the lossless encoding unit 67, and the output unit 68 reencode the decoding result of the encoded data of the original block corresponding to the macro block MB (x, y)_t using the parameter determined again, and output the obtained encoded stream.

When the parameter of the macro block MB (x, y)_t is not the prohibition parameter, the parameter decoder 62 determines that it is not necessary to modify the parameter and supplies the encoded stream of the original block corresponding to the macro block MB (x, y)_t to the output unit 68. The output unit 68 outputs the encoded stream as the encoded stream of the macro block MB (x, y)_t of the multi-picture reproduction image as it is.

After steps S63, S65, S67, S69, or S70, the processing proceeds to step S71. In step S71, the encoding processing unit 60 increments the variable x by 1 and advances the processing to step S72.

In step S72, the encoding processing unit 60 determines whether the variable x is equal to the number X of macro blocks in the horizontal direction. In step S72, when it is determined that the variable x is not equal to the number X of macro blocks (the variable x is smaller than the number X of macro blocks), the processing proceeds to step S62.

Meanwhile, in step S72, when it is determined that the variable x is equal to the number X of macro blocks, the processing proceeds to step S73 and the encoding processing unit 60 resets the variable x to "0" and increments the variable y by 1.

In step S74, the encoding processing unit 60 determines whether the variable y is equal to the number Y of macro blocks in the vertical direction. In step S74, when it is determined that the variable y is not equal to the number Y of macro blocks (the variable y is smaller than the number Y of macro blocks), the processing returns to step S62.

Meanwhile, in step S74, when it is determined that the variable y is equal to the number Y of macro blocks, the processing ends.

[Position Change Processing of Macro Block MB (x, y)_t]

Figure 18:
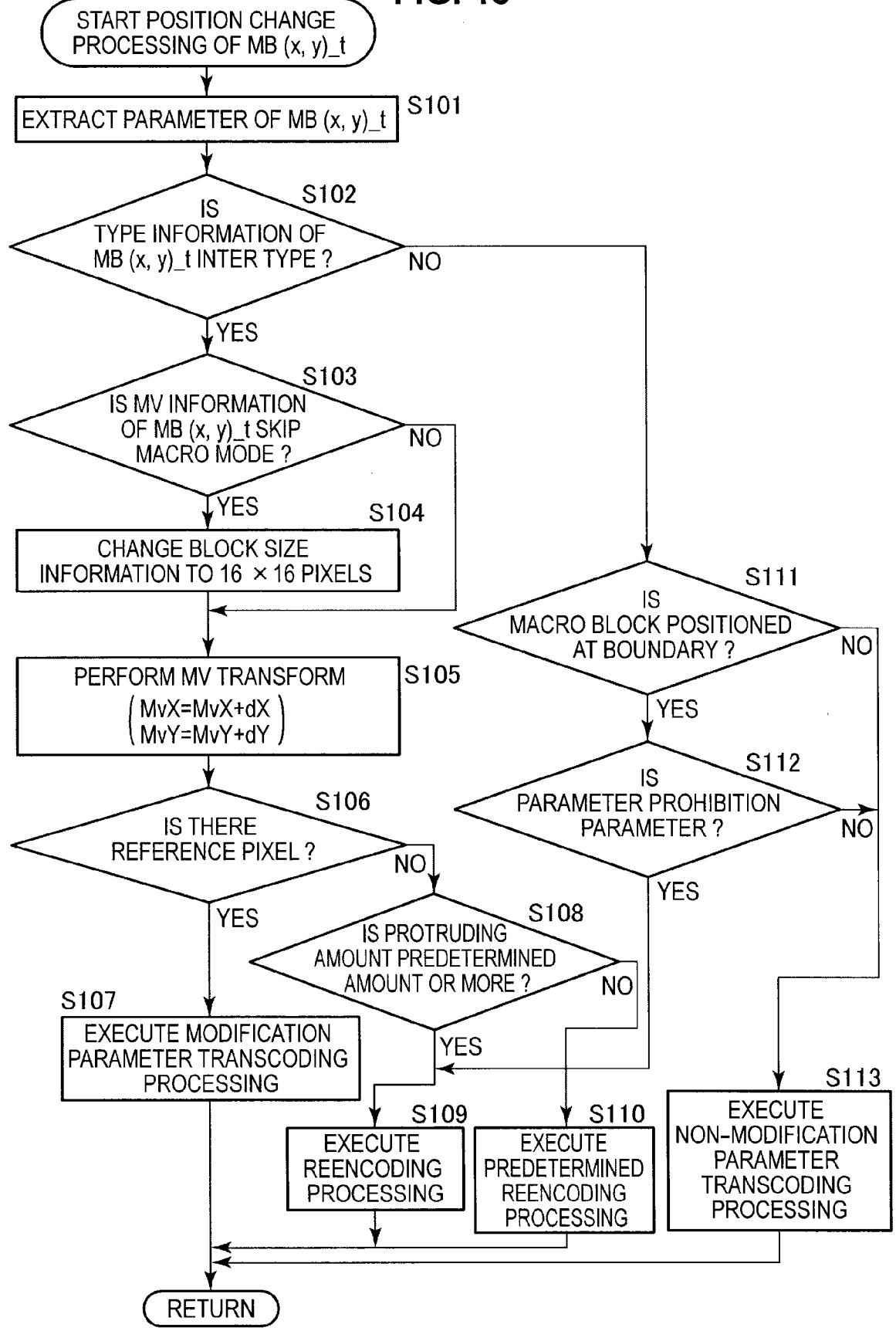
FIG. 18 is a flowchart showing position change processing.

FIG. 18 is a detailed flowchart of position change processing of the macro block MB (x, y)_t that is executed in step S69 of FIG. 17.

First, in step S101, the parameter decoder 62 extracts the parameter included in the encoded stream of the original block corresponding to the macro block MB (x, y)_t input through the switch 61 as the parameter of the macro block MB (x, y)_t.

In step S102, the parameter decoder 62 determines whether the type information of the original block corresponding to the macro block MB (x, y)_t is an inter type on the basis of the parameter extracted in step S101.

In step S102, when it is determined that the type information of the original block corresponding to the macro block MB (x, y)_t is the inter type, the parameter decoder 62 determines that it is not necessary to perform the reencoding. The parameter decoder 62 supplies the parameter extracted in step S101 and the encoded data included in the encoded stream of the original block to the parameter modifying unit 63.

In step S103, the parameter modifying unit 63 determines whether the MV information of the original block corresponding to the macro block MB (x, y)_t is a skip macro mode on the basis of the parameter supplied from the parameter decoder 62.

When it is determined that the MV information is the skip macro mode in step S103, in step S104, the parameter modifying unit 63 changes (updates) block size information to 16×16 pixels. Next, the processing proceeds to step S105.

Meanwhile, when it is determined that the MV information is not the skip macro mode in step S103, step S104 is skipped and the processing proceeds to step S105.

In step S105, the parameter modifying unit 63 performs MV transform of the macro block MB (x, y)_t. Specifically, if the original motion vector of the macro block MB (x, y)_t is set to (MvX, MvY) and the movement amount from the position before the change to the position after the change is set to (dX, dY), the parameter modifying unit 63 updates a new motion vector of the macro block MB (x, y)_t to (MvX+dX, MvY+dY) and updates the MV information with the motion vector thereof.

In step S106, the parameter modifying unit 63 determines whether there is a reference pixel based on the new motion vector (MvX+dX, MvY+dY) of the macro block MB (x, y)_t, that is, whether there is a reference pixel in the screen of the multi-picture reproduction image.

In step S106, when it is determined that there is the reference pixel, the processing proceeds to step S107 and the encoding processing unit 60 executes modification parameter transcoding processing for performing modification parameter transcoding. Specifically, the parameter modifying unit 63 adds the updated parameter to the encoded data supplied from the parameter decoder 62, supplies the obtained encoded stream to the output unit 68, and outputs the encoded stream as the encoded stream of the macro block MB (x, y)_t.

Meanwhile, when it is determined that there is no reference pixel in step S106, in step S108, the parameter modifying unit 63 determines whether the protruding amount of the reference pixel to the screen of the multi-picture reproduction image is the predetermined amount or more.

When it is determined that the protruding amount is the predetermined amount or more in step S108, the parameter modifying unit 63 requests the parameter decoder 62 to supply the image data to the parameter determining unit 64. Next, the processing proceeds to step S109 and the encoding processing unit 60 executes reencoding processing with respect to the macro block MB (x, y)_t.

Specifically, the parameter decoder 62 decodes the encoded data of the original block corresponding to the macro block MB (x, y)_t and supplies the obtained image data to the parameter determining unit 64. The parameter determining unit 64 executes the intra prediction processing and the motion compensation processing using the image data supplied from the parameter decoder 62 and the referenced image data and determines the parameter again. The intra prediction/motion compensation unit 65, the DCT/quantization unit 66, and the lossless encoding unit 67 encode the image data using the parameter determined again and add the parameter. The output unit 68 outputs the obtained encoded stream as the encoded stream of the macro block MB (x, y)_t.

Meanwhile, when it is determined that the protruding amount is not the predetermined amount or more in step S108, the parameter modifying unit 63 requests the parameter decoder 62 to supply the image data to the parameter determining unit 64 and supplies the parameter after the modification to the parameter decoder 62. The processing proceeds to step S110 and the encoding processing unit 60 executes the predetermined reencoding processing with respect to the macro block MB (x, y)_t.

Specifically, the parameter decoder 62 decodes the encoded data of the original block corresponding to the macro block MB (x, y)_t and supplies the obtained image data and the modified parameter to the parameter determining unit 64. The parameter determining unit 64 determines the modified parameter supplied from the parameter decoder 62 as a new parameter. The intra prediction/motion compensation unit 65, the DCT/quantization unit 66, and the lossless encoding unit 67 encode the image data using the modified parameter. At this time, because the reference pixel is not in the screen of the multi-picture reproduction image, the predetermined reference pixel is referenced. The parameter is added to the encoded image data and the output unit 68 outputs the obtained encoded stream as the encoded stream of the macro block MB (x, y)_t.

In step S102 described above, when it is determined that the type information of the macro block MB (x, y)_t is the intra type, the processing proceeds to step S111. In step S111, the parameter decoder 62 determines whether the macro block MB (x, y)_t is positioned at the boundary of the slice or the frame in the multi-picture reproduction image.

When it is determined that that the macro block MB (x, y)_t is positioned at the boundary of the slice or the frame in the multi-picture reproduction image in step S111, in step S112, the parameter decoder 62 determines whether the parameter of the macro block MB (x, y)_t is the prohibition parameter.

When it is determined that the parameter of the macro block MB (x, y)_t is the prohibition parameter in step S112, the parameter decoder 62 determines that it is necessary to perform the reencoding and supplies the image data to the parameter determining unit 64. The processing proceeds to step S109 and the encoding processing unit 60 executes the reencoding processing described above.

Meanwhile, when it is determined that the macro block MB (x, y)_t is not positioned at the boundary of the slice or the frame in the multi-picture reproduction image in step S111 or when it is determined that the parameter of the macro block MB (x, y)_t is not the prohibition parameter in step S112, the parameter decoder 62 determines that it is not necessary to modify the parameter.

In step S113, the encoding processing unit 60 executes non-modification parameter transcoding processing with respect to the macro block MB (x, y)_t of the time t. Specifically, the parameter decoder 62 determines that it is not necessary to modify the parameter and supplies the encoded stream of the original block corresponding to the macro block MB (x, y)_t to the output unit 68. The output unit 68 outputs the encoded stream as the encoded stream of the macro block MB (x, y)_t of the multi-picture reproduction image as it is.

As described above, the content distributing server 11 previously generates the plurality of encoded streams of the different display sizes and stores the encoded streams with respect to all of the picture contents that can be distributed. On the basis of the received viewing arrangement request, the content distributing server 11 performs the parameter transcoding with respect to the previously generated encoded stream, generates one encoded stream of a multi-picture reproduction image in which a plurality of pictures are arranged, and transmits the encoded stream to the content receiving device 13.

Therefore, because one encoded stream is provided from the content distributing server 11 to the content receiving device 13, the content receiving device 13 can display the multi-picture reproduction image even when the content receiving device is a device that is not be able to reproduce only one encoded stream.

The parameter transcoding amount when the content distributing server 11 of the server side generates the multi-picture reproduction image is basically the same as the parameter transcoding amount when an encoded stream of one kind of picture content is generated. Therefore, high-speed processing can be executed as compared with the method of generating a multi-picture reproduction image according to the related art.

When the parameter becomes the prohibition parameter by the change of the position of the boundary of the slice or the frame, the content distributing server 11 performs the reencoding instead of the parameter transcoding. Therefore, generation of decoding error by standard violation of the encoded stream of the multi-picture reproduction image can be prevented.

When the display position of the picture content is changed, the content distributing server 11 corrects the motion vector on the basis of the change of the display position of the picture content, such that the pixel to be referenced originally is referenced. When the reference pixel based on the corrected motion vector is not in the screen of the multi-picture reproduction image, the content distributing server 11 performs the reencoding instead of the parameter transcoding. Therefore, generation of the deterioration of the image quality by referencing of the pixel not to be the pixel to be referenced originally can be prevented.

As described above, the content distributing server 11 performs the parameter transcoding using the parameter of the previously generated encoded stream as much as possible, reencodes only a portion in which the standard violation or the deterioration of the image quality is anticipated, and generates an encoded stream of a multi-picture reproduction image. Therefore, the content distributing server 11 can suppress the processing load and the deterioration of the image quality to a minimum and follow the encoded standard.

In order to simplify the description, the processing by the DCT/quantization unit 66 and the lossless encoding processing by the lossless encoding unit 67 are not executed when the parameter transcoding has been executed. However, the processing by the DCT/quantization unit 66 and the lossless encoding processing by the lossless encoding unit 67 may be executed even when the parameter transcoding is performed.

Figure 19:
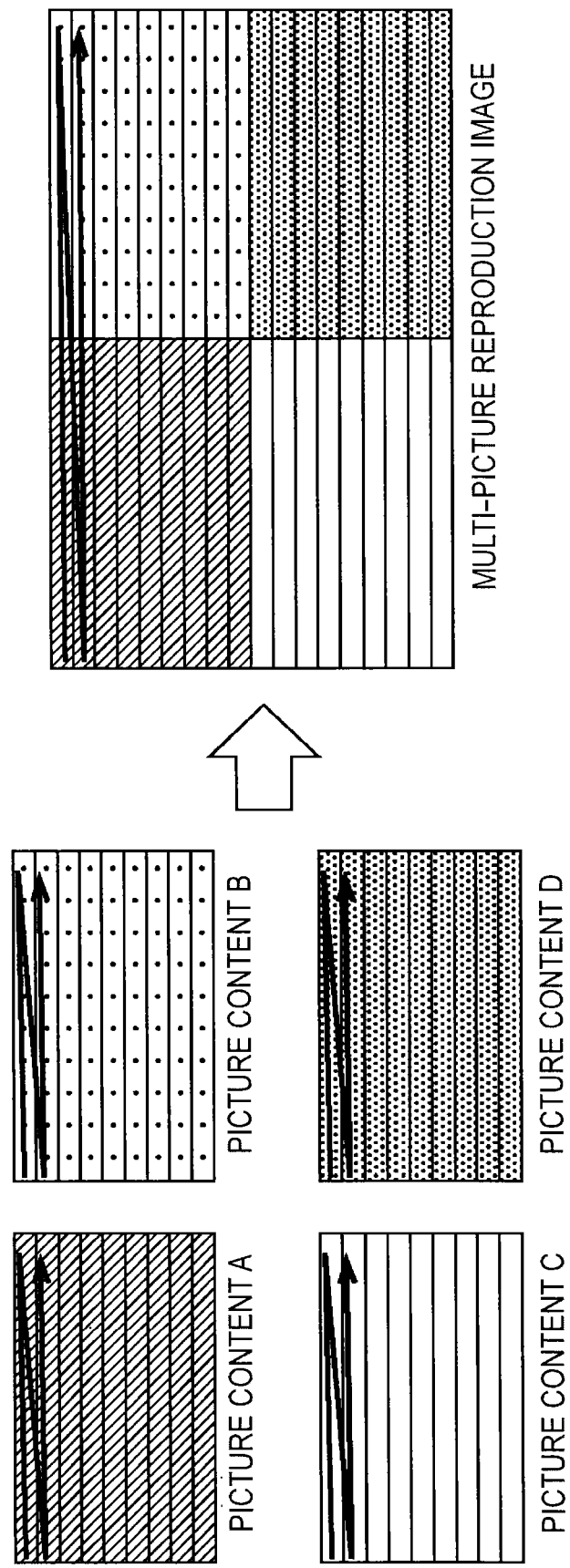
FIG. 19 is a diagram showing a processing sequence of lossless encoding.

For example, when the amount of bits to be generated is controlled by changing quantization precision before and after the parameter transcoding, the encoded data is decoded and the processing by the DCT/quantization unit 66 and the lossless encoding processing by the lossless encoding unit 67 are executed. As shown in FIG. 19, when a plurality of picture contents A to D are arranged on the same slice of a multi-picture reproduction image, the encoded data is decoded with respect to the boundary of the picture content and the processing by the DCT/quantization unit 66 and the lossless encoding processing by the lossless encoding unit 67 are executed.

That is, the lossless encoding depends on upper and lower blocks of a macro block of a lossless encoding object. Therefore, as shown in FIG. 19, the lossless encoding is performed with respect to the macro blocks of the picture contents A to D, in order from left to right and from top to bottom in each of the picture contents, by referencing the upper and left blocks. Meanwhile, it is necessary to perform the lossless encoding with respect to the macro block of the multi-picture reproduction image in order from left to right and from top to bottom in the entire multi-picture reproduction image, by referencing the upper and lower sides. Therefore, it is necessary to perform the lossless encoding again at the boundary of the picture content.

As described above, the lossless encoding depends on peripheral blocks of the macro block of the lossless encoding object. For this reason, when the lossless encoding of the peripheral blocks is performed again, the encoded data is decoded and the processing by the DCT/quantization unit 66 and the lossless encoding processing by the lossless encoding unit 67 are executed.

In the above description, when the parameters are determined again at the time of the reencoding, the original parameters are not referenced. However, the original parameters may be referenced. For example, the type information among the original parameters may be used as the type information among the parameters after the update. In this case, when the type information is the intra type, the parameters are determined again by performing only the intra prediction and when the type information is the inter type, the parameters are determined again by performing only the motion compensation. Therefore, the processing load can be reduced as compared with the case in which the original parameters are not referenced. Meanwhile, when the original parameters are not referenced, the deterioration of the image quality can be suppressed, because a most suitable prediction image can be generated.

The encoding method of the present disclosure may be an HEVC (high efficiency video coding) method, in addition to the AVC method. When the encoding method is the HEVC method, intra prediction modes of brightness signals in which sizes of prediction blocks are 8×8 pixels are 34 intra prediction modes that include intra prediction modes of 33 directions and an intra prediction mode showing DC Prediction, as shown in FIG. 20. In addition, intra prediction modes of brightness signals in which sizes of prediction blocks are 16×16 pixels, 32×32 pixels, and 64×64 pixels correspond to the coordinates (dxIntra, dyIntra) and the number of modes is 33, as shown in FIG. 21. The coordinates (dxIntra, dyIntra) show the position of a line at which the pixels used as the prediction pixels among the adjacent blocks adjacent to the prediction blocks cross with respect to a base point pixel of an end point other than a base point pixel of the predetermined coordinates (x, y). That is, the pixels that are used as the prediction pixels among the adjacent blocks cross a line coupling the base point pixel and the position of the coordinates (x+dxIntra, y+dyIntra).

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

Figure 22:
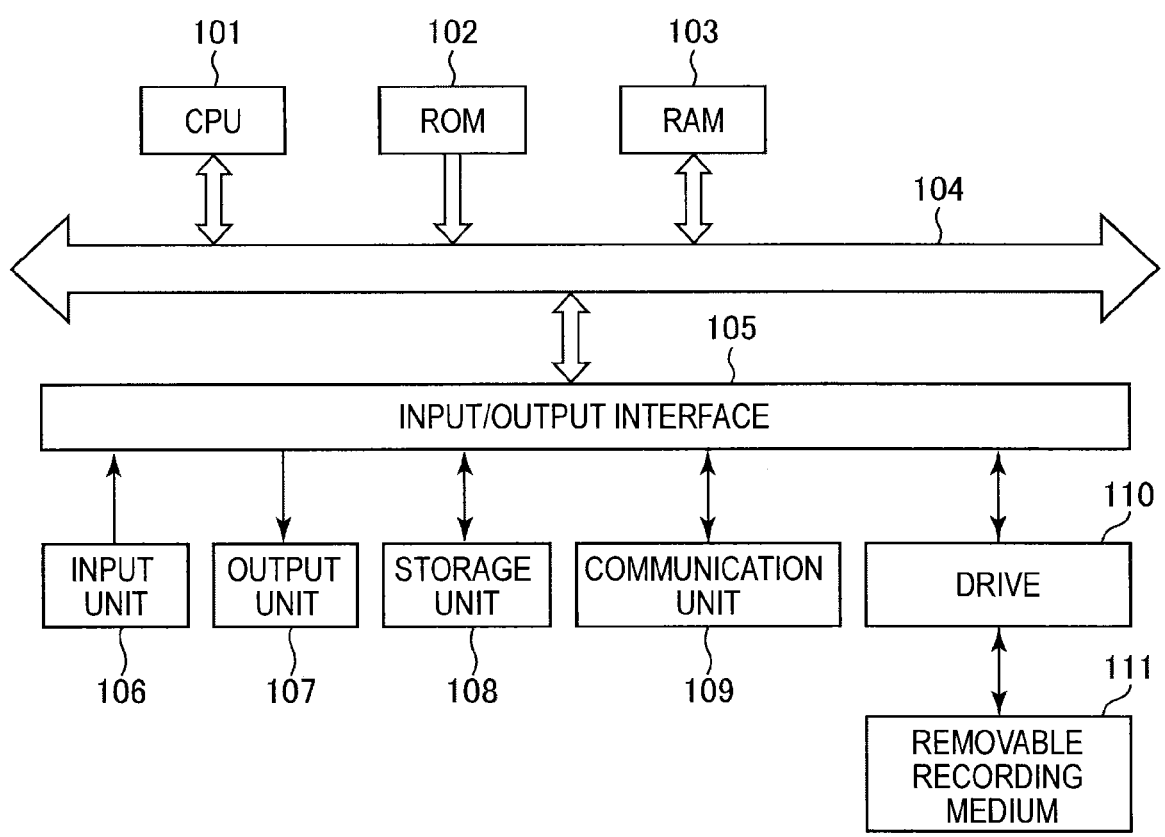
FIG. 22 is a block diagram showing a configuration example of an embodiment of a computer to which the present disclosure is applied.

FIG. 22 is a block diagram showing a configuration example of an embodiment of a computer that executes the series of processes described earlier and functions as the content distributing server 11 or the content receiving device 13.

In the computer, a central processing unit (CPU) 101, a read only memory (ROM) 102 and a random access memory (RAM) 103 are mutually connected by a bus 104.

An input/output interface 105 is also connected to the bus 104. An input unit 106, an output unit 107, a storage unit 108, a communication unit 109, and a drive 110 are connected to the input/output interface 105.

The input unit 106 is configured from a keyboard, a mouse, a microphone or the like. The output unit 107 configured from a display, a speaker or the like. The storage unit 108 is configured from a hard disk, a non-volatile memory or the like. The communication unit 109 is configured from a network interface or the like. The drive 110 drives a removable recording media 111 such as a magnetic disk, an optical disk, a magneto-optical disk, a semiconductor memory or the like.

In the computer configured as described above, the CPU 101 loads a program that is stored, for example, in the storage unit 108 onto the RAM 103 via the input/output interface 105 and the bus 104, and executes the program. Thus, the above-described series of processing is performed.

When the content distributing server 11 is configured using a computer, a CPU 101 executes processing for previously generating a plurality of encoded streams of different display sizes and parameter transcoding processing corresponding to the encoding processing unit 60 with respect to each of a plurality of picture contents. A storage unit 108 stores the encoded streams of the plurality of display sizes of each of the previously generated picture contents. The communication unit 109 receives the viewing arrangement request from the content receiving device 13 or transmits the generated encoded stream to the content receiving device 13.

When the content receiving device 13 is configured using a computer, the CPU 101 generates the viewing arrangement request or decodes the encoded stream of one stream, generates a multi-picture reproduction image, and displays the multi-picture reproduction image on a display unit (output unit 107). The communication unit 109 transmits the viewing arrangement request to the content distributing server 11 or receives the encoded stream of one stream transmitted from the content distributing server 11 and supplies the encoded stream to the CPU 101.

As one example, the program executed by the computer (the CPU 101) may be provided by being recorded on the removable recording medium 111 as a packaged medium or the like. The program can also be provided via a wired or wireless transfer medium, such as a local area network, the Internet, or a digital satellite broadcast.

In the computer, by loading the removable recording medium 111 into the drive 110, the program can be installed into the storage unit 108 via the input/output interface 105. It is also possible to receive the program from a wired or wireless transfer medium using the communication unit 109 and install the program into the storage unit 108. As another alternative, the program can be installed in advance into the ROM 102 or the storage unit 108.

Note that steps written in the flowcharts accompanying this specification may of course be executed in a time series in the illustrated order, but such steps do not need to be executed in a time series and may be carried out in parallel or at necessary timing, such as when the processes are called.

In the present disclosure, the system means a set of structural elements (devices and modules (products), etc.) and all of the structural elements may or may not be stored in the same casing. Therefore, a plurality of devices that are stored in different casings and are connected through a network and one device in which a plurality of modules are stored in one casing is also the system.

The embodiments of the present disclosure are not limited to the embodiments described above and various changes can be made without departing from a scope of the present disclosure.

For example, in the embodiments, the example in which the multi-picture reproduction image is configured using the picture contents of the three sizes (small) and the picture content of one size (middle) has been described. However, the multi-picture reproduction image is not limited thereto. In other words, in the multi-picture reproduction image, the display sizes of the picture contents and the number or the arrangement of picture contents to be displayed (viewed) simultaneously on one screen can be appropriately set.

In the embodiments, the content distributing server 11 generates the encoded streams of the sizes of all of the picture contents to be synthesized and stores the encoded streams by itself. However, the plurality of encoded streams of the different display sizes to be synthesized may be generated by another server (computer) and the content distributing server 11 may acquire the encoded streams and generate a multi-picture reproduction image. The content distributing server 11 may combine and use the encoded streams that are generated by itself and the encoded streams that are acquired from another server.

The multi-picture reproduction image is configured using the combination of the picture contents of the different display sizes. However, only a plurality of picture contents of the same sizes may be combined.

The present disclosure can take a configuration of cloud computing for sharing one function with a plurality of devices through a network and commonly executing processing.

The steps that are described in the flowchart may be executed by one device or may be executed by a plurality of devices.

When a plurality of processes are included in one step, the plurality of processes that are included in one step may be executed by one device or may be executed by a plurality of devices.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image processing apparatus comprising:
an encoding processing unit that generates a plurality of encoded streams of different display sizes with respect to each of a plurality of picture contents, encodes the picture contents in units of predetermined blocks using the encoded streams, and generates an encoded stream of a multi-picture reproduction image to display the plurality of picture contents at the same time,
wherein, when parameters regarding encoding of an original block that is a block of the picture contents corresponding to the predetermined block, which are included in the encoded streams of the picture contents, are prohibition parameters prohibited in the encoded stream of the multi-picture reproduction image, the encoding processing unit decodes the encoded streams of the original block, reencodes the streams, and sets the obtained encoded streams as the encoded streams of the predetermined block, and when the parameters of the original block are not the prohibition parameters, the encoding processing unit sets the encoded streams of the original block as the encoded streams of the predetermined block.

(2) The image processing apparatus according to (1), further comprising:
a receiving unit that receives display information showing a change of a display range of the multi-picture reproduction image,
wherein, when the display information is received by the receiving unit, the encoding processing unit determines whether the parameters of the original block are the prohibition parameters.

(3) The image processing apparatus according to (1) or (2),
wherein the prohibition parameters are parameters that are prohibited in the encoded streams of the predetermined block positioned at a boundary of a slice or a frame of the multi-picture reproduction image.

(4) The image processing apparatus according to any one of (1) to (3),
wherein, when the parameters of the original block are not the prohibition parameters and include a motion vector corresponding to a reference pixel, the encoding processing unit updates the motion vector on the basis of a change of display positions of the picture contents forming the multi-picture reproduction image, and sets the encoded streams of the original block in which the motion vector is updated as the encoded streams of the predetermined block.

(5) The image processing apparatus according to (4),
wherein, when there are the picture contents based on the updated motion vector in a screen of the multi-picture reproduction image, the encoding processing unit sets the encoded streams of the original block including the motion vector as the encoded streams of the predetermined block, and when the picture contents based on the updated motion vector are not in the screen of the multi-picture reproduction image, the encoding processing unit decodes the encoded streams of the original block corresponding to the motion vector, reencodes the streams, and sets the obtained encoded streams as the encoded streams of the predetermined block.

(6) The image processing apparatus according to any one of (1) to (5),
wherein, when the parameters of the original block are not the prohibition parameters and include a skip macro mode as information showing a motion vector of the original block, the encoding processing unit calculates a motion vector corresponding to a reference pixel of the predetermined block on the basis of a change of display positions of the picture contents forming the multi-picture reproduction image, updates the skip macro mode with the motion vector, and sets the encoded streams of the original block in which the parameters are updated as the encoded streams of the predetermined block.

(7) An image processing method comprising:
generating, with an image processing apparatus, a plurality of encoded streams of different display sizes with respect to each of a plurality of picture contents, encoding the picture contents in units of predetermined blocks using the encoded streams, and generating an encoded stream of a multi-picture reproduction image to display the plurality of picture contents at the same time,
wherein, in the encoding processing step, when parameters regarding encoding of an original block that is a block of the picture contents corresponding to the predetermined block, which are included in the encoded streams of the picture contents, are prohibition parameters prohibited in the encoded stream of the multi-picture reproduction image, the encoded streams of the original block are decoded, the streams are reencoded, and the obtained encoded streams are set as the encoded streams of the predetermined block, and when the parameters of the original block are not the prohibition parameters, the encoded streams of the original block are set as the encoded streams of the predetermined block.

(8) An image processing system comprising a server device and a client device, wherein the server device includes an encoding processing unit that generates a plurality of encoded streams of different display sizes with respect to each of a plurality of picture contents, encodes the picture contents in units of predetermined blocks using the encoded streams, and generates an encoded stream of a multi-picture reproduction image to display the plurality of picture contents at the same time, and a transmitting unit that transmits the encoded stream of the multi-picture reproduction image generated by the encoding processing unit to the client device, when parameters regarding encoding of an original block that is a block of the picture contents corresponding to the predetermined block, which are included in the encoded streams of the picture contents, are prohibition parameters prohibited in the encoded stream of the multi-picture reproduction image, the encoding processing unit decodes the encoded streams of the original block, reencodes the streams, and sets the obtained encoded streams as the encoded streams of the predetermined block, and when the parameters of the original block are not the prohibition parameters, the encoding processing unit sets the encoded streams of the original block as the encoded streams of the predetermined block, and the client device includes a receiving unit that receives the encoded stream of the multi-picture reproduction image transmitted by the transmitting unit, and a display control unit that displays the multi-picture reproduction image on a predetermined display unit on the basis of the received encoded stream of the multi-picture reproduction image.

The present disclosure contains subject matter related to that disclosed in Japanese Priority Patent Application JP 2011-193808 filed in the Japan Patent Office on Sep. 6, 2011, the entire content of which is hereby incorporated by reference.

What is claimed is:

1. An image processing apparatus comprising:
an encoding processing unit that generates a plurality of encoded streams of different display sizes with respect to each of a plurality of picture contents, encodes the picture contents in units of predetermined blocks using the encoded streams, and generates an encoded stream of a multi-picture reproduction image to display the plurality of picture contents at the same time,
wherein, when parameters regarding encoding of an original block that is a block of the picture contents corresponding to the predetermined block, which are included in the encoded streams of the picture contents, are prohibition parameters prohibited in the encoded stream of the multi-picture reproduction image, the encoding processing unit decodes the encoded streams of the original block, reencodes the streams, and sets the obtained encoded streams as the encoded streams of the predetermined block, and when the parameters of the original block are not the prohibition parameters, the encoding processing unit sets the encoded streams of the original block as the encoded streams of the predetermined block.

2. The image processing apparatus according to claim 1, further comprising:
a receiving unit that receives display information showing a change of a display range of the multi-picture reproduction image,
wherein, when the display information is received by the receiving unit, the encoding processing unit determines whether the parameters of the original block are the prohibition parameters.

3. The image processing apparatus according to claim 1, wherein the prohibition parameters are parameters that are prohibited in the encoded streams of the predetermined block positioned at a boundary of a slice or a frame of the multi-picture reproduction image.

4. The image processing apparatus according to claim 1, wherein, when the parameters of the original block are not the prohibition parameters and include a motion vector corresponding to a reference pixel, the encoding processing unit updates the motion vector on the basis of a change of display positions of the picture contents forming the multi-picture reproduction image, and sets the encoded streams of the original block in which the motion vector is updated as the encoded streams of the predetermined block.

5. An image processing apparatus comprising:
an encoding processing unit that generates a plurality of encoded streams of different display sizes with respect to each of a plurality of picture contents, encodes the picture contents in units of predetermined blocks using the encoded streams, and generates an encoded stream of a multi-picture reproduction image to display the plurality of picture contents at the same time,
wherein, when parameters regarding encoding of an original block that is a block of the picture contents corresponding to the predetermined block, which are included in the encoded streams of the picture contents, are prohibition parameters prohibited in the encoded stream of the multi-picture reproduction image, the encoding processing unit decodes the encoded streams of the original block, reencodes the streams, and sets the obtained encoded streams as the encoded streams of the predetermined block, and when the parameters of the original block are not the prohibition parameters, the encoding processing unit sets the encoded streams of the original block as the encoded streams of the predetermined block,
wherein when the parameters of the original block are not the prohibition parameters and include a motion vector corresponding to a reference pixel, the encoding processing unit updates the motion vector on the basis of a change of display positions of the picture contents forming the multi-picture reproduction image, and sets the encoded streams of the original block in which the motion vector is updated as the encoded streams of the predetermined block, and
wherein, when there are the picture contents based on the updated motion vector in a screen of the multi-picture reproduction image, the encoding processing unit sets the encoded streams of the original block including the motion vector as the encoded streams of the predetermined block, and when the picture contents based on the updated motion vector are not in the screen of the multi-picture reproduction image, the encoding processing unit decodes the encoded streams of the original block corresponding to the motion vector, reencodes the streams, and sets the obtained encoded streams as the encoded streams of the predetermined block.

6. The image processing apparatus according to claim 1,
wherein, when the parameters of the original block are not the prohibition parameters and include a skip macro mode as information showing a motion vector of the original block, the encoding processing unit calculates a motion vector corresponding to a reference pixel of the predetermined block on the basis of a change of display positions of the picture contents forming the multi-picture reproduction image, updates the skip macro mode with the motion vector, and sets the encoded streams of the original block in which the parameters are updated as the encoded streams of the predetermined block.

7. An image processing method comprising:
generating, with an image processing apparatus, a plurality of encoded streams of different display sizes with respect to each of a plurality of picture contents, encoding the picture contents in units of predetermined blocks using the encoded streams, and generating an encoded stream of a multi-picture reproduction image to display the plurality of picture contents at the same time,
wherein, in the encoding processing step, when parameters regarding encoding of an original block that is a block of the picture contents corresponding to the predetermined block, which are included in the encoded streams of the picture contents, are prohibition parameters prohibited in the encoded stream of the multi-picture reproduction image, the encoded streams of the original block are decoded, the streams are reencoded, and the obtained encoded streams are set as the encoded streams of the predetermined block, and when the parameters of the original block are not the prohibition parameters, the encoded streams of the original block are set as the encoded streams of the predetermined block.

8. An image processing system comprising a server device and a client device,
wherein the server device includes an encoding processing unit that generates a plurality of encoded streams of different display sizes with respect to each of a plurality of picture contents, encodes the picture contents in units of predetermined blocks using the encoded streams, and generates an encoded stream of a multi-picture reproduction image to display the plurality of picture contents at the same time, and a transmitting unit that transmits the encoded stream of the multi-picture reproduction image generated by the encoding processing unit to the client device,
when parameters regarding encoding of an original block that is a block of the picture contents corresponding to the predetermined block, which are included in the encoded streams of the picture contents, are prohibition parameters prohibited in the encoded stream of the multi-picture reproduction image, the encoding processing unit decodes the encoded streams of the original block, reencodes the streams, and sets the obtained encoded streams as the encoded streams of the predetermined block, and when the parameters of the original block are not the prohibition parameters, the encoding processing unit sets the encoded streams of the original block as the encoded streams of the predetermined block, and
the client device includes a receiving unit that receives the encoded stream of the multi-picture reproduction image transmitted by the transmitting unit, and a display control unit that displays the multi-picture reproduction image on a predetermined display unit on the basis of the received encoded stream of the multi-picture reproduction image.

* * * * *